(12) United States Patent
Navarro et al.

(10) Patent No.: US 11,843,952 B2
(45) Date of Patent: Dec. 12, 2023

(54) AGGREGATED COMMUNICATION NETWORK

(71) Applicant: European Space Agency, Paris (FR)

(72) Inventors: Tomas Navarro, AZ Noordwijk (NL); Antonio Franchi, AZ Noordwijk (NL); Francisco Javier De Pablos, AZ Noordwijk (NL); David Gomez Otero, AZ Noordwijk (NL)

(73) Assignee: European Space Agency, Paris (FR)

( * ) Notice: Subject to any disclaimer, the term of this patent is extended or adjusted under 35 U.S.C. 154(b) by 0 days.

(21) Appl. No.: 17/770,221

(22) PCT Filed: Oct. 25, 2019

(86) PCT No.: PCT/EP2019/079275
§ 371 (c)(1),
(2) Date: Apr. 19, 2022

(87) PCT Pub. No.: WO2021/078399
PCT Pub. Date: Apr. 29, 2021

(65) Prior Publication Data
US 2022/0394488 A1    Dec. 8, 2022

(51) Int. Cl.
*H04L 12/44* (2006.01)
*H04W 16/10* (2009.01)
*H04W 84/04* (2009.01)

(52) U.S. Cl.
CPC ............. *H04W 16/10* (2013.01); *H04L 12/44* (2013.01); *H04W 84/04* (2013.01)

(58) Field of Classification Search
None
See application file for complete search history.

(56) References Cited

U.S. PATENT DOCUMENTS

2015/0124656 A1* 5/2015 Yamada ................. H04L 12/44
370/256
2016/0219516 A1* 7/2016 Subramanian .... H04W 52/0219
(Continued)

FOREIGN PATENT DOCUMENTS

WO  WO-2008096909 A1 *  8/2008  ............. H04L 12/44
WO  2009/056390 A2  5/2009
(Continued)

OTHER PUBLICATIONS

Patent Cooperation Treaty, International Search Report, Application No. PCT/EP2019/079275, dated Aug. 31, 2020, in 16 pages.
(Continued)

*Primary Examiner* — Ajit Patel
(74) *Attorney, Agent, or Firm* — Procopio, Cory, Hargreaves & Savitch LLP

(57) ABSTRACT

An aggregated communication network includes one or more communication networks and a plurality of network nodes arranged in a plurality of hierarchical layers, the network nodes including a central node at a highest layer and a remaining network nodes being arranged, as part of the one or more communication networks, in layers below the highest layer, with one or more spatially distributed network nodes at each layer below the highest layer. The network nodes in each communication network are interconnected in a tree-like structure via communication links, with respective sub-branches extending from the network nodes via network nodes in lower layers. The one or more communication networks are connected to the central node in a star-like structure via respective communication links between the central node and respective network nodes in a next-to-highest layer. The communication links between network nodes in a lowest layer.

18 Claims, 17 Drawing Sheets

(56) References Cited

U.S. PATENT DOCUMENTS

| | | | |
|---|---|---|---|
| 2016/0278079 A1* | 9/2016 | Xhafa | H04L 41/0886 |
| 2016/0316386 A1 | 10/2016 | Futaki et al. | |
| 2017/0063613 A1* | 3/2017 | Bloch | H04L 12/44 |
| 2018/0123893 A1* | 5/2018 | Ahmed | H04W 16/10 |
| 2018/0341662 A1* | 11/2018 | He | H04L 67/52 |
| 2020/0059538 A1* | 2/2020 | De Smet | H04L 67/34 |

FOREIGN PATENT DOCUMENTS

| | | | | |
|---|---|---|---|---|
| WO | 2010/138289 A1 | 12/2010 | | |
| WO | 2013/029143 A1 | 3/2013 | | |
| WO | WO-2019008130 A1 * | 1/2019 | | H04L 12/44 |

OTHER PUBLICATIONS

Kidston et al., Intelligent Sensing for Automated Spectrum Assignment, Communications Research Centre Canada, dated 2019, in 6 pages.

* cited by examiner

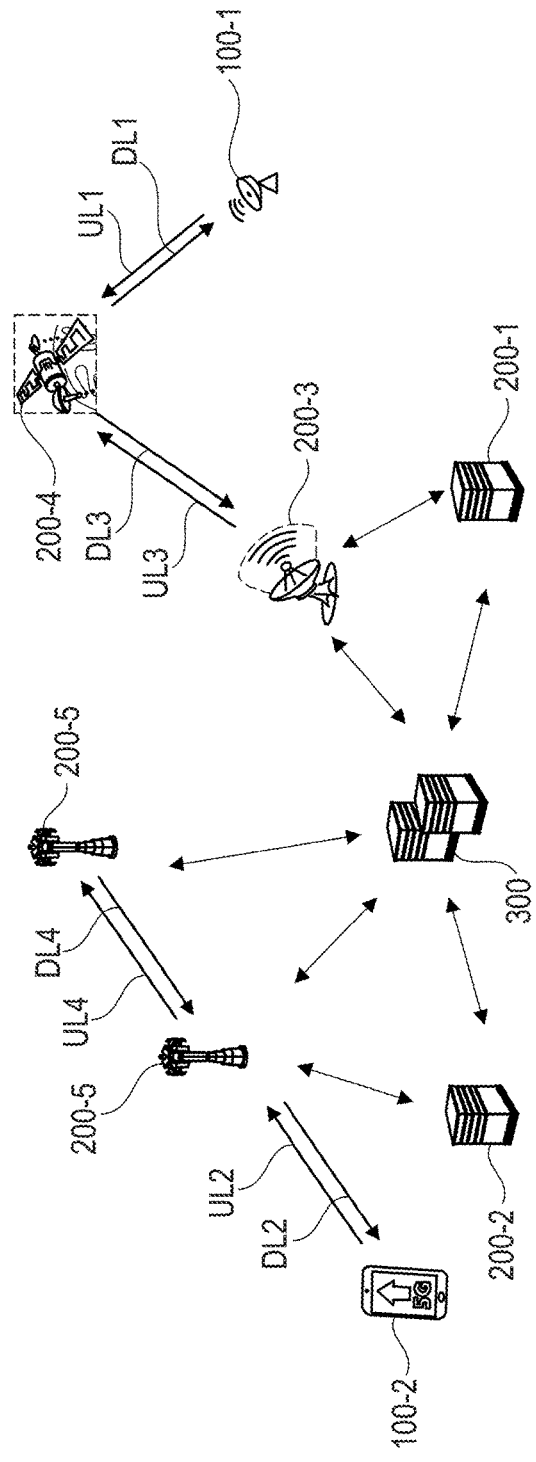
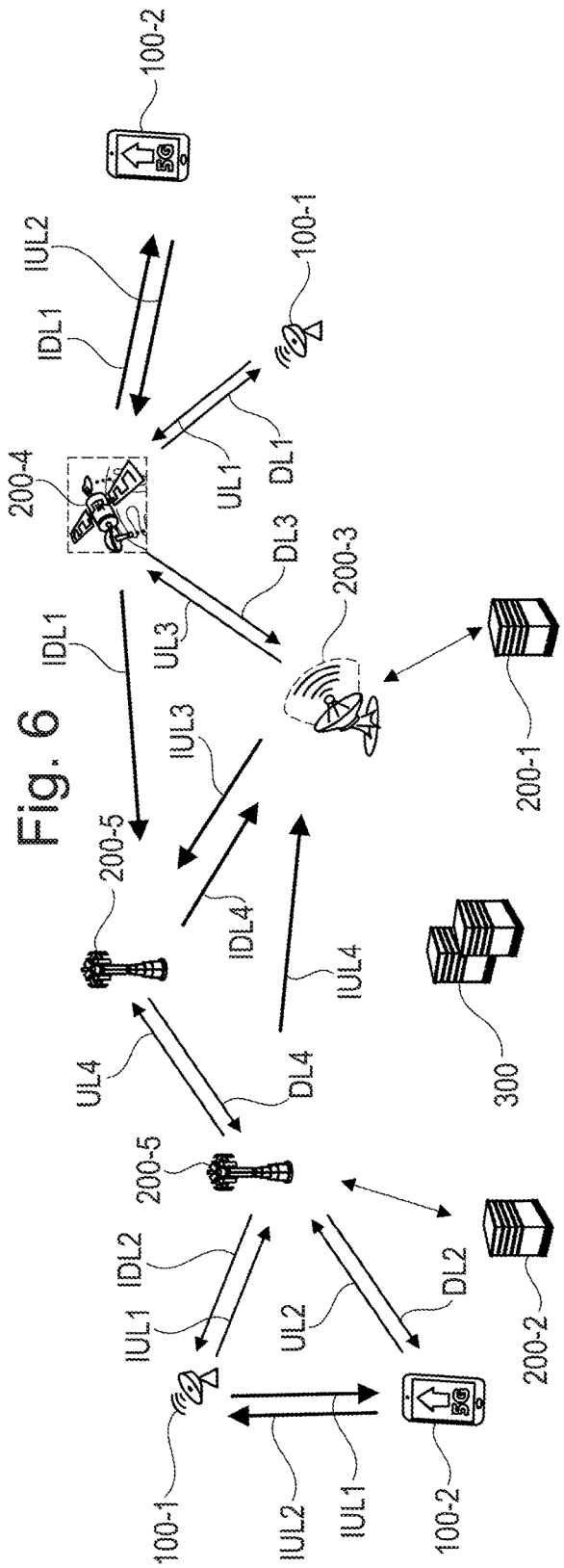

AGGREGATED COMMUNICATION NETWORK

CROSS-REFERENCE TO RELATED APPLICATIONS

This application is US National Stage of International Patent Application PCT/EP2019/079275, filed Oct. 25, 2019, the contents of which are incorporated herein by reference.

TECHNICAL FIELD

This application relates to an aggregated (e.g., global) communication network composed of one or more communication networks, and to central nodes and network nodes in such aggregated communication networks. In particular, the application relates to global artificial-intelligence-driven cognitive communication networks. The application further relates to corresponding operating methods of such aggregated communication networks and of nodes thereof.

BACKGROUND

The ever-growing connectivity requirements for voice and data communications, combined with the constraints placed by traditional static and exclusive spectrum assignment policies enforced today, have made radio frequency spectrum a very scarce and expensive resource. The situation is further exacerbated by the advent of new global systems, like satellite mega-constellations and 5G (fifth generation mobile communication), adding demands in terms of spectrum, as well as operational challenges in terms of global and dynamic spectrum resource management.

To date, spectrum allocations (or frequency allocations, frequency spectrum allocations) are still manually tailored for each system and class of service, with legacy Fixed Spectrum Access (FSA) policies that offer little possibilities for optimization, resulting in inefficiencies in terms of spectrum usage.

Thus, there is a need for improved techniques for spectrum assignment in communication systems (communication networks) involving wireless (e.g., radio) communication links. There is further need for aggregated communication networks and network nodes, as well as methods of operating these entities, that implement such improved techniques.

SUMMARY

In view of some or all of these needs, the present disclosure proposes an aggregated communication network, a central node thereof, a network node thereof, and corresponding operation methods, having the features of the respective independent claims.

An aspect of the disclosure relates to an aggregated communication network composed of one or more communication networks and comprising a plurality of network nodes arranged in a plurality of hierarchical layers. The aggregated communication network may be a global communication network. The plurality of network nodes may include a central node at the highest layer and the remaining network nodes may be arranged, as part of the one or more communication networks, in the layers below the highest layer, with one or more spatially distributed network nodes at each layer below the highest layer. The network nodes in each communication network may be interconnected in a tree-like structure via communication links, with respective sub-branches extending from the network nodes via network nodes in lower layers. The communication links may involve relay nodes in some implementations. The one or more communication networks may be connected to the central node in a star-like structure via respective communication links between the central node and respective network nodes in the next-to-highest layer. Accordingly, the central node may be referred to as a parent node or stem node. Communication links between network nodes in the lowest layer and network nodes in the next-to-lowest layer may be wireless communication links (such as radio communication links, for example). Communication links between other layers may be wireless as well in some implementations. Network nodes in at least one layer (e.g., the next-to-lowest layer, which may include satellites or terrestrial stations as the network nodes, and/or the third lowest layer which may include gateway stations for the satellites or terrestrial stations) may be configured to measure frequency environments of the respective network node and to generate respective measurement reports. Measuring a network node's frequency environment may relate to measuring levels of utilization in each relevant portion (e.g., frequency sub-band) of the frequency spectrum at the network node's location, or to obtaining Traffic Utilization Reports (TURs). Further, the network nodes may be configured to generate first information relating to measured frequency environments based on measurement reports of network nodes in lower layers in their respective sub-branch, and, if available, also based on the own measurement report for the respective network node, and to provide the respective first information to a network node in the next higher layer that is connected with the respective network node. At each network node, the first information may be further generated based on items of first information received from the network nodes at the next lower layer that are connected with the respective network node. The central node may be configured to generate second information relating to a status of utilization of portions of a frequency spectrum and/or relating to recommendations for utilizable portions of the frequency spectrum based on items of first information received at the central node, and to provide the second information to network nodes in the next-to-highest layer that are connected with the central node. In addition to items of first information, the central node may also receive external information from other sources, such as frequency range constraints from regulatory databases, for example. The second information may include location-dependent (and possibly time-dependent) indications of status of utilization of portions of the frequency spectrum. The second information may be specific or include specific subsets, for respective communication networks or sub-branches of communication networks. The network nodes may be configured to receive items of second information from respective network nodes in the next higher layer that are connected with the respective network node and to provide items of second information to network nodes in the next lower layer that are connected with the respective network node, based on the received second information. Each network node may generate its own item of second information for its sub-branch based on the second information received from the next higher layer. The network nodes may be further configured to operate in accordance with a variable (e.g., dynamically variable) level of authority that indicates a layer that is the lowest layer including network nodes that are allowed to, for their respective sub-branches, assign portions of a frequency spectrum to the wireless communication links between network nodes in the lowest hierarchical layer and network nodes in the next-to-lowest hierarchical layer. Upon necessity to assign a portion of the frequency spectrum to a given wireless communication link between a network node in the lowest layer and a network node in the next-to-lowest layer, a network node whose sub-branch includes the given wireless communication link may be configured to determine a portion of the frequency spectrum for assignment to the given wireless communication link based on the first information and the second information available at that network node. The network node may further be configured to assign the determined portion of the frequency spectrum to the given wireless communication link, for example via respective instruction messages. The lowest-layer network node seeking to determine a portion of the frequency spectrum for assignment to the given wireless communication link may be present in the layer indicated by the level of authority. Notably, the proposed technique may also be applied to wireless communication links between other layers, such as to wireless communication links between the second lowest and third lowest layers, for example (e.g., between satellites and satellite gateways).

Configured as described above, the aggregated communication network enables a global frequency optimization and management system to be used among multiple operators of satellite and/or terrestrial networks. As such, it reduces or even removes the need for frequency filing (e.g., by providing virtualized access to spectrum), enables exploitation of unused spectrum, thereby improving system spectrum efficiency (e.g., efficiency of spectrum utilization), facilitates co-existence of multiple satellite systems utilizing same frequency bands (e.g., integration of Low Earth Orbit (LEO) and Non-Geostationary Satellite Orbit (NGSO) constellations), facilitates co-existence of satellite and terrestrial networks utilizing the same frequency bands (e.g., integration of 5G), helps to jointly reduce intra-system interference (within communication networks in the aggregated communication network) and inter-system interference (between communication networks in the aggregated communication network), reduces barriers to entries for new operators and service providers, and enables new services, owing to improved system spectrum efficiency.

In some embodiments, each network node of at least one layer (e.g., at least one layer below the highest layer, possibly all layers, or all layers apart from the lowest layer) may be configured to determine a portion of the frequency spectrum for assignment to a wireless communication link in its sub-branch based on an optimization criterion for joint optimization of frequency resource utilization and level of interference that would result from the assignment (e.g., that is expected to result from the assignment). The level of interference may relate to a level of intra-system interference (e.g., within the communication network including the wireless communication link) and inter-system interference (e.g., between the communication network including the wireless communication link and other communication networks of the aggregated communication network). In this sense, the network node may seek to jointly optimize frequency resource allocation, intra-system interference, and inter-system interference. Joint optimization may relate to, for example, maximizing resource utilization (resource usage) while still maintaining a certain (possibly predefined) level of Quality of Service (QoS). The optimization criterion may involve a cost function, for example. Thereby, improved resource utilization at acceptable QoS can be achieved.

In some embodiments, each network node of at least one layer (e.g., at least one layer below the highest layer, possibly all layers, or all layers apart from the lowest layer) may be configured to determine a portion of the frequency spectrum for assignment to a wireless communication link in its sub-branch, using a machine-learning-based model. A respective machine-learning-based model or algorithm, may be implemented in each network node of the at least one layer (possibly in all layers, with the exception of network nodes at the lowest layer), including the central node. Each model may be based on an optimization criterion (e.g. cost function) for the frequency resource utilization, intra-system interference, and inter-system interference.

Implementing a machine-learning-based algorithm/model in the network nodes enables improved utilization of the information available at the network nodes, in particular the items of first and second information available at the network nodes. This further enables collaborative learning between the network nodes, give the exchange of knowledge via the first and second information that is distributed through the aggregated communication network.

In some embodiments, the level of authority may be dynamically set for each of respective sub-branches extending from network nodes in a given layer of the aggregated communication network. The level of authority may be set specifically for each of these sub-branches. For example, these sub-branches may extend from the hierarchy layer below the central node. In this sense, the level of authority may be dynamically set for each communication network in the aggregated communication network. The level of authority may be (dynamically) set by the central node. For example, the central node may be configured to (dynamically) determine a value for the level of authority. This determination may be based on the first information available at the central node.

Thereby, a suitable operating point of the aggregated communication network in terms of autonomy can be set, based on a location-dependent frequency utilization. Accordingly, frequency assignment can be decentralized if possible and centralized if needed.

In some embodiments, upon necessity to assign a portion of the frequency spectrum to the given wireless communication link between the network node in the lowest layer and the network node in the next-to-lowest layer, the network node whose sub-branch includes the given wireless communication link may be configured to, if it determines that it cannot identify a portion of the frequency spectrum for assignment to the given wireless communication link, pass a request for assignment of a portion of the frequency spectrum to the given wireless communication link to the network node in the next higher layer that is connected to that network node. This passing-on of requests to higher layers may successively continue until a network node determines that it can identify a portion of the frequency spectrum for assignment to the given wireless communication link. Thereby, it is ensured that an information-backed decision on the frequency assignment is made within the aggregated communication network, favoring decentralized frequency assignment where possible.

In some embodiments, the central node may be configured to assess a level of interference, and to determine whether to override any assignment of a portion of the frequency spectrum to a wireless communication link performed by a network node at a layer below the highest layer, based on a result of the assessment. The level of interference may be assessed/determined for a given portion of the frequency spectrum and for a given location or area. To this end, the central node may refer to the items of first information received from network nodes at lower layers. The assessment may be performed, among other instances, upon assignment of a portion of the frequency spectrum to a wireless communication link performed by a network node at a layer below the highest layer. In case the central node finds that it is necessary to override an assignment of a portion of the frequency spectrum to a wireless communication link performed by a network node at a layer below the highest layer, it may also re-assess the current value of the level of authority. For example, if the central node finds that an assignment by a lower-layer network node is not beneficial in terms of level of interference and/or resource utilization, it may raise the level of authority, thereby possibly preventing the network node that had performed the assignment from future assignments.

In some embodiments, the central node may be further configured to, if any assignment of a portion of the frequency spectrum to a wireless communication link performed by a network node at a layer below the highest layer is subject to override, determine a portion of the frequency spectrum for assignment to the given wireless communication link and assign said portion of the frequency spectrum to the given wireless communication link. Thereby, optimal frequency allocation in terms of resource utilization and level of interference can be ensured at all times, even if a lower-layer network node performs a frequency assignment that has negative impact unforeseeable to the respective network node.

In some embodiments, the central node may be configured to assess a level of interference, and to determine whether to maintain the currently set value of the level of authority, based on a result of the assessment. The central node may additionally assess a level of resource utilization for this purpose. The level of interference and/or the level of resource utilization may be assessed/determined for a given portion of the frequency spectrum and/or for a given location. To this end, the central node may refer to the items of first information received from network nodes at lower layers. The assessment may be performed, among other instances, upon assignment of a portion of the frequency spectrum to a wireless communication link performed by a network node at a layer below the highest layer. Further, if the currently set value of the level of authority shall not be maintained, the central node may be configured to determine a new value of the level of authority based on the items of first information received at the central node, and issue instructions to the network nodes at layers below the highest layer indicative of the new value of the level of authority.

In some embodiments, the central node may be configured to determine a frequency and location dependent map of resource utilization based on the items of first information received at the central node, and to generate the second information based on the frequency-location-dependent map. This may imply that the central node has knowledge of the (real-time) locations of the network nodes at lower layers. The map may be further dependent on time, in the sense that it captures a history of earlier frequency and location dependent maps and/or an extrapolation to future frequency and location dependent maps. This map may also be used for the above determination of whether to override any frequency assignment and the above determination of whether the currently set value of the level of authority shall be maintained. This map allows to compile the first information available at the central node in a meaningful way, making it particularly accessible to machine-learning-based algorithms/models and enabling an efficient generation of the second information.

In some embodiments, the central node may be configured to, upon a network node assigning a portion of the frequency spectrum to a given wireless communication link, determine whether the current level of authority shall be maintained. If not, the central node may be configured to adjust the level of authority and issue a message indicating the adjusted level of authority.

In some embodiments, the network nodes in the lowest layer may be configured to issue requests (frequency requests) for assignment of a portion of the frequency spectrum to the wireless communication link between the respective network node and a network node in the next-to-lowest hierarchical layer that is connected to the respective network node.

In some embodiments, the aggregated communication network may include five layers from the lowest layer to the highest layer. The network nodes at the lowest layer may relate to user terminals. The network nodes at the next-to-lowest layer may relate to satellite transmitters (satellites) or terrestrial transmitters (terrestrial stations). The network nodes at the third lowest layer (third layer) may relate to gateway stations for the satellite transmitters or the terrestrial transmitters. The network nodes at the fourth lowest layer (fourth layer) or next-to-highest layer may relate to network operation centers of respective communication networks within the aggregated communication network.

Another aspect of the disclosure relates to a network node for use in a hierarchical layer of an aggregated communication network composed of one or more communication networks and comprising a plurality of network nodes arranged in a plurality of hierarchical layers. The plurality of network nodes may include a central node at the highest layer and the remaining network nodes may be arranged, as part of the one or more communication networks, in the layers below the highest layer, with one or more spatially distributed network nodes at each layer below the highest layer. The network nodes in each communication network may be interconnected in a tree-like structure via communication links, with respective sub-branches extending from the network nodes via network nodes in lower layers. The one or more communication networks may be connected to the central node in a star-like structure via respective communication links between the central node and respective network nodes in the next-to-highest layer. Communication links between network nodes in the lowest layer and network nodes in the next-to-lowest layer may be wireless communication links. The network node may be configured to measure a frequency environment of the network node and to generate a measurement report thereof. The network node may be further configured to generate first information relating to measured frequency environments based on measurement reports of network nodes in lower layers in the sub-branch of the network node and the own measurement report of the network node, and to provide the first information to a network node in the next higher layer that is connected with the network node. The network node may be further configured to receive an item of second information relating to a status of utilization of portions of a frequency spectrum and/or to recommendations for utilizable portions of the frequency spectrum from a respective network node in the next higher layer that is connected with the network node, and to provide items of second information to network nodes in the next lower layer that are connected with the network node, based on the received second information.

The network node may be further configured to operate in accordance with a dynamically variable level of authority that indicates a layer that is the lowest layer including network nodes that are allowed to, for their respective sub-branches, assign portions of a frequency spectrum to the wireless communication links between network nodes in the lowest hierarchical layer and network nodes in the next-to-lowest hierarchical layer. The network node may be yet further configured to, upon necessity to assign a portion of the frequency spectrum to a given wireless communication link between a given network node in the lowest layer and a given network node in the next-to-lowest layer in the sub-branch of the network node, determine a portion of the frequency spectrum for assignment to the given wireless communication link based on the first information and the second information available at the network node.

Another aspect relates to a central node for use in an aggregated communication network composed of one or more communication networks and comprising a plurality of network nodes arranged in a plurality of hierarchical layers. The plurality of network nodes may include a central node at the highest layer and the remaining network nodes may be arranged, as part of the one or more communication networks, in the layers below the highest layer, with one or more spatially distributed network nodes at each layer below the highest layer. The network nodes in each communication network may be interconnected in a tree-like structure via communication links, with respective sub-branches extending from the network nodes via network nodes in lower layers. The one or more communication networks may be connected to the central node in a star-like structure via respective communication links between the central node and respective network nodes in the next-to-highest layer. Communication links between network nodes in the lowest layer and network nodes in the next-to-lowest layer may be wireless communication links. Network nodes in at least one layer may be configured to measure frequency environments of the respective network node and to generate respective measurement reports thereof. The network nodes may be configured to generate first information relating to measured frequency environments based on measurement reports of network nodes in lower layers in their respective sub-branch, and, if available, the own measurement report for the respective network node, and to provide the respective first information to a network node in the next higher layer that is connected with the respective network node. The central node may be configured to generate second information relating to a status of utilization of portions of a frequency spectrum and/or to recommendations for utilizable portions of the frequency spectrum based on items of first information received at the central node, and to provide the second information to network nodes in the next-to-highest layer that are connected with the central node.

Another aspect of the disclosure relates to a method of operating an aggregated communication network composed of one or more communication networks and comprising a plurality of network nodes arranged in a plurality of hierarchical layers. The plurality of network nodes may include a central node at the highest layer and the remaining network nodes may be arranged, as part of the one or more communication networks, in the layers below the highest layer, with one or more spatially distributed network nodes at each layer below the highest layer. The network nodes in each communication network may be interconnected in a tree-like structure via communication links, with respective sub-branches extending from the network nodes via network nodes in lower layers. The one or more communication networks may be connected to the central node in a star-like structure via respective communication links between the central node and respective network nodes in the next-to-highest layer. Communication links between network nodes in the lowest layer and network nodes in the next-to-lowest layer may be wireless communication links. The method may include, by network nodes in at least one layer, measuring frequency environments of the respective network nodes and to generate respective measurement reports thereof. The method may further include, by the network nodes, generating first information relating to measured frequency environments based on measurement reports of network nodes in lower layers in their respective sub-branch, and, if available, the own measurement report for the respective network node, and providing the respective first information to a network node in the next higher layer that is connected with the respective network node. The method may further include, by the central node, generating second information relating to a status of utilization of portions of a frequency spectrum and/or to recommendations for utilizable portions of the frequency spectrum based on items of first information received at the central node, and providing the second information to network nodes in the next-to-highest layer that are connected with the central node. The method may further include, by the network nodes, receiving items of second information from respective network nodes in the next higher layer that are connected with the respective network node and providing items of second information to network nodes in the next lower layer that are connected with the respective network node, based on the received second information. The method may further include, by the network nodes, operating in accordance with a dynamically variable level of authority that indicates a layer that is the lowest layer including network nodes that are allowed to, for their respective sub-branches, assign portions of a frequency spectrum to the wireless communication links between network nodes in the lowest hierarchical layer and network nodes in the next-to-lowest hierarchical layer. The method may yet further include, upon necessity to assign a portion of the frequency spectrum to a given wireless communication link between a network node in the lowest layer and a network node in the next-to-lowest layer, by a network node whose sub-branch includes the given wireless communication link, determining a portion of the frequency spectrum for assignment to the given wireless communication link based on the first information and the second information available at that network node.

Another aspect of the disclosure relates to a method of operating a network node in a hierarchical layer of an aggregated communication network composed of one or more communication networks and comprising a plurality of network nodes arranged in a plurality of hierarchical layers. The plurality of network nodes may include a central node at the highest layer and the remaining network nodes may be arranged, as part of the one or more communication networks, in the layers below the highest layer, with one or more spatially distributed network nodes at each layer below the highest layer. The network nodes in each communication network may be interconnected in a tree-like structure via communication links, with respective sub-branches extending from the network nodes via network nodes in lower layers. The one or more communication networks may be connected to the central node in a star-like structure via respective communication links between the central node and respective network nodes in the next-to-highest layer. Communication links between network nodes in the lowest layer and network nodes in the next-to-lowest layer may be wireless communication links. The method may include, by the network node, measuring a frequency environment of the network node and generating a measurement report thereof. The method may further include, by the network node, generating first information relating to measured frequency environments based on measurement reports of network nodes in lower layers in the sub-branch of the network node and the own measurement report of the network node, and providing the first information to a network node in the next higher layer that is connected with the network node. The method may further include, by the network node, receiving an item of second information relating to a status of utilization of portions of a frequency spectrum and/or to recommendations for utilizable portions of the frequency spectrum from a respective network node in the next higher layer that is connected with the network node, and providing items of second information to network nodes in the next lower layer that are connected with the network node, based on the received second information. The method may further include, by the network node, operating in accordance with a dynamically variable level of authority that indicates a layer that is the lowest layer including network nodes that are allowed to, for their respective sub-branches, assign portions of a frequency spectrum to the wireless communication links between network nodes in the lowest hierarchical layer and network nodes in the next-to-lowest hierarchical layer. The method may yet further include, by the network node, upon necessity to assign a portion of the frequency spectrum to a given wireless communication link between a given network node in the lowest layer and a given network node in the next-to-lowest layer in the sub-branch of the network node, determining a portion of the frequency spectrum for assignment to the given wireless communication link based on the first information and the second information available at the network node.

Yet another aspect of the disclosure relates to a method of operating a central node in an aggregated communication network composed of one or more communication networks and comprising a plurality of network nodes arranged in a plurality of hierarchical layers. The plurality of network nodes may include a central node at the highest layer and the remaining network nodes may be arranged, as part of the one or more communication networks, in the layers below the highest layer, with one or more spatially distributed network nodes at each layer below the highest layer. The network nodes in each communication network may be interconnected in a tree-like structure via communication links, with respective sub-branches extending from the network nodes via network nodes in lower layers. The one or more communication networks may be connected to the central node in a star-like structure via respective communication links between the central node and respective network nodes in the next-to-highest layer. Communication links between network nodes in the lowest layer and network nodes in the next-to-lowest layer may be wireless communication links. Network nodes in at least one layer may be configured to measure frequency environments of the respective network node and to generate respective measurement reports. The network nodes may be configured to generate first information relating to measured frequency environments based on measurement reports of network nodes in lower layers in their respective sub-branch, and, if available, the own measurement report for the respective network node, and to provide the respective first information to a network node in the next higher layer that is connected with the respective network node. The method may include, by the central node, generating second information relating to a status of utilization of portions of a frequency spectrum and/or to recommendations for utilizable portions of the frequency spectrum based on items of first information received at the central node, and providing the second information to network nodes in the next-to-highest layer that are connected with the central node.

It will be appreciated that apparatus features and method steps may be interchanged in many ways. In particular, the details of the disclosed apparatus (e.g., aggregated communication network or aggregated communication system) can be realized by the corresponding method of operating the apparatus or parts thereof, and vice versa, as the skilled person will appreciate. Moreover, any of the above statements made with respect to the apparatus are understood to likewise apply to the corresponding method, and vice versa.

BRIEF DESCRIPTION OF THE FIGURES

Example embodiments of the disclosure are explained below with reference to the accompanying drawings, wherein FIG. 1 schematically illustrates an example of an aggregated communication network according to embodiments of the disclosure, FIG. 6 shows a specific example of an aggregated communication network according to embodiments of the disclosure, FIG. 7 shows examples of possible instances of inter-system interference in the aggregated communication network illustrated in FIG. 6, FIG. 8 to FIG. 16 illustrate ladder diagrams showing examples of actions of network nodes and information flows between network nodes in an aggregated communication network according to embodiments of the disclosure.

DETAILED DESCRIPTION

Figure 1:
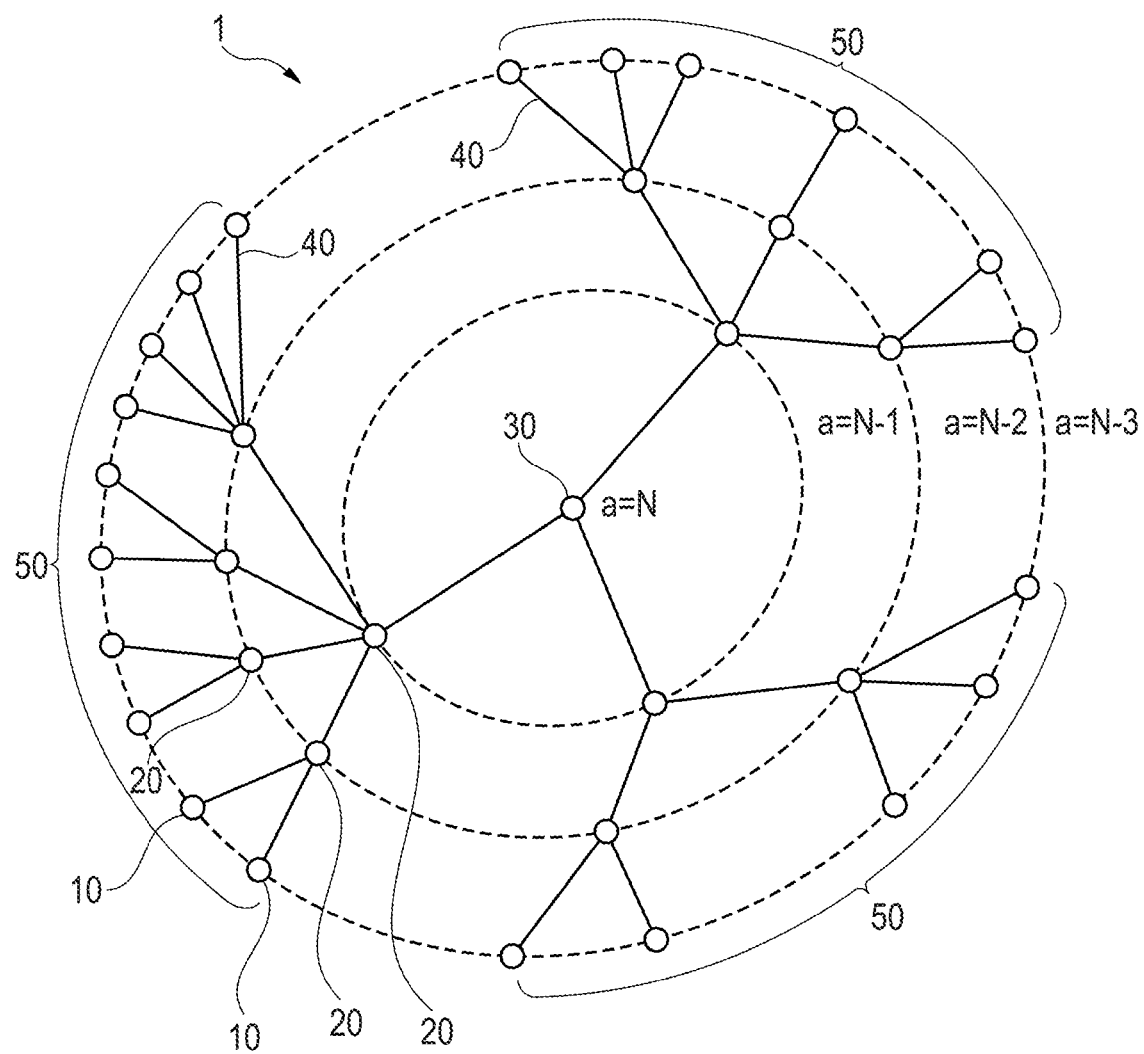

Broadly speaking, the present invention proposes an aggregated (possibly global) frequency optimization and management system ("system") to be used among multiple operators of satellite and/or terrestrial networks. The system is formed by combining distributed Artificial Intelligence-driven Cognitive Radio (CR) nodes (for example incorporating a Deep-Reinforcement Learning algorithm as a core element) connected to a centralized entity ("central node"). As such, the proposed system may be referred to as an aggregated communication network (e.g., global communication network) composed by one or more (preferably, multiple) communication networks that may each be operated by a distinct entity. The central element (central node) may be a cloud-based inter-network Artificial Intelligence Agent, which produces spectrum recommendations and assignments, based on intelligent algorithms, preferably including Deep Reinforcement Learning and on distributed cognitive node decisions While details of embodiments of the present disclosure will be described below, they can achieve the following objectives:

- Optimize intra and inter-system spectrum utilization
- Reduce/remove the need for frequency filing (e.g., by providing virtualized access to spectrum)
- Enable exploitation of unused spectrum, thereby improving system spectrum efficiency (e.g., efficiency of spectrum utilization)
- Facilitate co-existence of multiple satellite systems utilizing same frequency bands (e.g., integration of LEO and NGSO constellations)
- Facilitate co-existence of satellite and terrestrial networks utilizing same frequency bands (e.g., integration of 5G)
- Reduce intra and inter-system interference
- Reduce barriers to entries for new operators and service providers
- Enable new services, owing to improved system spectrum efficiency.

Main elements of aggregated communication networks according to embodiments of the disclosure include the following:

- Distributed Cognitive Radios for each network element (or at least some network elements), with self-decision capabilities (e.g., machine-learning-based algorithms)
- A central node, for example implementing a centralized cloud-based AI-driven agent (e.g., an AI-driven Database-Assisted Resource managEment System (AID-ARES)).

The proposed frequency optimization and management system may be operated by one or more third party entities as a service to the network operators of individual communication networks in the aggregated communication network. In some cases, the service provider(s) may act as a frequency broker(s), coordinating frequencies (both unassigned frequencies and frequencies assigned to a specific operator), based on a number of criteria, including:

- Unassigned frequencies will dynamically be made available to any network operator connected to the system
- Frequencies assigned to a specific operator can be released from the operator to the central pool of the proposed system, to be dynamically made available to any other operator connected to the system, until needed by the operator
- Frequencies can be shared both in time and geography among operators, according to intelligent rules and provided that the operator's minimum quality of service criteria remain satisfied
- In some cases, a credit system may be operated based on the resources (frequencies) requested from the system or offered to the system from each network operator.
- The various networks connected to the system may operate with various degrees of autonomy (corresponding to respective levels of authority), utilizing cognitive radios.

Advantages and potential use cases of the proposed scheme may be appreciated from the following example system configurations.

As a first example system configuration, there may be provided a combination of two or more satellite communication systems (satellite communication networks), each comprising at least one satellite and one satellite earth station, for communication via a satellite with a plurality of satellite terminals using one or more satellite links (as examples of wireless communication links). The satellite links of the two different systems may overlap or coincide in frequency. Each of the satellite terminals may include means for inhibiting interference between its satellite links and the other satellite links.

As a second example system configuration, there may be provided a combined satellite and terrestrial communication system (communication network) comprising at least one satellite and one satellite earth station, for communication via a satellite with a plurality of terminals using one or more satellite links, and further comprising a plurality of terrestrial stations (e.g., cellular base stations for mobile communication, such as 3G, 4G, 5G base stations, etc.), for communication with the plurality of terminals using one or more terrestrial links (as examples of wireless communication links). The satellite links may overlap or coincide in frequency with the terrestrial links. Each of the terminals may include means for inhibiting interference between the satellite links and the terrestrial links.

As a third example system configuration, there may be provided a combination of two or more terrestrial communication systems, each comprising at least one or more terrestrial stations, for communication with a plurality of terrestrial terminals using one or more terrestrial links. The terrestrial links of the two different systems may overlap or coincide in frequency. Each of the terrestrial terminals may include means for inhibiting interference between its terrestrial links and the other terrestrial links.

As a fourth example system configuration, there may be provided a combination of two or more satellite or terrestrial communication systems, each comprising at least either one satellite and one satellite earth station, for communication via a satellite with a plurality of satellite terminals using one or more satellite links, or each comprising at least one or more terrestrial stations, for communication with a plurality of terrestrial terminals using one or more terrestrial links. The satellite or terrestrial links of the two different systems may overlap or coincide in frequency. There may be a central node providing means for inhibiting interference between each link and the other links.

As a fifth example system configuration, there may be provided a combination of two or more satellite or terrestrial communication systems, each comprising at least either one satellite and one satellite earth station, for communication via a satellite with a plurality of satellite terminals using one or more satellite links, or each comprising at least one or more terrestrial stations, for communication with a plurality of terrestrial terminals using one or more terrestrial links. The satellite or terrestrial links of the two different systems may overlap or coincide in frequency; and there may be a central node providing means for inhibiting interference between each link and the other links. Each communication system communicates with a central node to negotiate the level of autonomy in providing means for inhibiting interference between each link and the other links.

The aggregated communication system proposed by the present disclosure is based at least in part on the following factors and findings. Following the advent of new communication technologies and their associated increase of spectrum requirements, national and international regulatory bodies, such as ITU and FCC, have shown interest and willingness to support new spectrum management practices that might contribute to the integration of new systems while protecting existing services.

Cognitive Radios (CR) are part of a set of candidate technologies for counteracting spectrum scarcity by seeking to opportunistically share and reuse licensed spectrum. For example, a cognitive radio system could use already licensed but underutilized portions of the electromagnetic spectrum without human intervention until its primary user becomes active again. Such shared use could be implemented, for example, on a "non-claim, non-interference" basis.

Moreover, cognitive radio is expected to be a key enabler to support the integration of 5G and mega-constellations where the level of complexity in assigning spectrum is envisaged to be extremely high. In order to achieve efficient and dynamic time-frequency-space resource allocation and management to improve the utilization of the spectrum, cognitive radio can be combined with artificial intelligence and machine-learning techniques so that an adaptive and intelligent allocation can be achieved. However, one of the main drawbacks of isolated cognitive radios is the high latency due to the spectrum sensing and computational time on the radio especially if the frequency sweep is performed across a wideband.

Several other spectrum sharing techniques including power control, beam-forming, beam hopping, and spectrum databases have been proposed and studied as potential solutions. All these techniques, however, are tools that can contribute towards a more efficient way of accessing spectrum, rather than a system to solve the issue of spectrum management and spectrum sharing. In addition, these techniques are not sufficiently scalable to address the issue at a global-scale, but rather focus on local solutions with either geographic restrictions, limited stakeholders, or particular frequency bands. Finally, these techniques assume non-cooperation among different network operators, rather than a global cooperative system.

The present disclosure addresses all the identified deficiencies. In particular, it proposes a system which solves spectrum management and spectrum sharing on a global basis and among different network operators. The system acts as an inter-network orchestrator (and in some cases, broker), allowing both cooperative and non-cooperative operation modes, as well as both centralized and decentralized autonomous decision making capabilities in terms of spectrum usage. One of the features of the system is to determine the optimum operating autonomy level ("level of authority"), on a scale ranging from one extreme with fully autonomous spectrum assignment on a network by network basis, or even on a network node (CR enabled) basis, to the other extreme, where the assignment is fully centralized under the control of the central node (e.g., central cloud based AIDARES agent).

Notably, the proposed system makes use of distributed artificial intelligence nodes to find the level of centralized/de-centralized autonomy for each network element to optimize the usage of the spectrum and reduce interference across networks. It addressed the identified problems on a global basis, allowing for integrated satellite-terrestrial spectrum management and sharing.

In the following, example embodiments of the disclosure will be described with reference to the appended figures. Identical elements in the figures may be indicated by identical reference numbers, and repeated description thereof may be omitted for reasons of conciseness.

The present disclosure proposes an aggregated (e.g., global) communication network composed of one or more communication networks, each "owned" by a respective network operator. An example of such aggregated communication network 1 is schematically illustrated in FIG. 1. The aggregated communication network 1 comprises a plurality of network nodes 10, 20, 30 arranged in a plurality of hierarchical layers. The plurality of network nodes include a central node 30 (e.g., the AIDARES) at the highest layer and the remaining network nodes 10, 20 are arranged, as part of one or more communication networks 50, in the layers below the highest layer. It is understood that the network nodes at each layer below the highest layer may be spatially distributed. It is further understood that the communication networks 50 may be spatially distributed as well, possible with partial spatial overlap among them.

The network nodes 10, 20 in each communication network 50 are interconnected in a tree-like structure via communication links 40. From each network node (except for network nodes 10 in the lowest layer), a sub-branch of the tree-like structure extends from the respective network node via network nodes in lower layers that are connected to the respective network node via communication links. In some implementations, the communication links may include relay nodes that simply relay any data/information/messages that they receive. It is understood that these relay nodes do not need to have the properties of the network nodes of the aggregated communication network 1 as described throughout the disclosure.

The one or more communication networks 50 are connected to the central node 30 in a star-like structure via respective communication links between the central node 30 and respective network nodes 20 in the next-to-highest layer. In this sense, the central node 30 may be referred to as the parent node or stem node of the aggregated communication network 1.

The communication networks 50 (and thus, the aggregated communication network) may together span parts of continents, full continents, or even the globe. Each communication network 50 has an (initial) associated frequency spectrum, possibly for a given area, that it can use for assignment to wireless communication links (e.g., radio communication links). One idea of the present disclosure is that each communication network 50 makes currently unused parts of its frequency spectrum available for dynamical assignment (allocation) to wireless communication links of other communication networks 50 in the aggregated communication network 1. The portions of frequency spectrum made available to the aggregated communication network 1 may be seen as being pooled by the aggregated communication network 1.

In the aggregated communication network 1, communication links between network nodes in the lowest layer 10 and network nodes 20 in the next-to-lowest layer are wireless communication links (e.g., radio communication links) and require assignment of a portion of a frequency spectrum for being used. These wireless communication links may include an uplink (UL) and a downlink (DL), for example. The techniques proposed in the present disclosure may be applied to either. It is further understood that also communication links between further layers may be wireless. For example, assuming network nodes that are implemented by satellites (e.g., satellite transmitters) with receiving and transmission (Rx/Tx) capabilities, both the communication links to user terminals as well as communication links to the satellites' gateways may be wireless communication links.

Accordingly, the network nodes 10 in the lowest layer may issue requests (frequency requests) for assignment of a portion of the frequency spectrum to the wireless communication link between the respective network node 10 and a network node 20 in the next-to-lowest hierarchical layer that is connected to the respective network node 10. These requests may trigger a frequency assignment process by the aggregated communication network 1, in which a portion of the available frequency spectrum (e.g., available at the location of the wireless communication link or at the location of the network node 10) is determined and assigned to the wireless communication link.

In the example of FIG. 1, four hierarchical layers (or simply "layers" for short) are shown. The highest layer is the fourth layer, and the lowest layer is the first layer. In general, there may be N layers, in which case the N-th layer would be the highest layer and the first layer would be the lowest layer. The layers may be indicated by a layer index, such as "a" or "i", wherein a higher layer index indicates a layer that is higher in the hierarchy of layers ("higher layer") and a lower layer index indicates a layer that is lower in the hierarchy of layers ("lower layer").

In one example that is of practical relevance, the aggregated communication network 1 comprises five layers (N=5), with user terminals as the network nodes 10 at the lowest layer (i.e., first layer, a=1) and the central node 30 at the highest layer (i.e., fifth layer, a=5). In this example, the network nodes at the next-to-lowest layer (second layer, a=2) relate to satellite transmitters (SATs) or terrestrial transmitters. The network nodes 20 at the third layer (a=3) relate to gateway stations (GWs) for the satellite transmitters or the terrestrial transmitters. Finally, the network nodes 20 at the forth layer or next-to-highest layer (a=4) relate to network operation centers (NOCs). Communication links between the user terminals and the satellite transmitters or terrestrial transmitters are wireless communication links (e.g., radio communication links) and are subject to assignment of portions of a frequency spectrum as described in the present disclosure.

Optimum spectrum management and spectrum sharing in the aggregated communication network can be achieved by introducing an Artificial Intelligence-driven cognitive network, where both spectrum sensing and frequency management and assignments are distributed across the network, for example between the space and the ground segment. The central node 30 (e.g., a centralized cloud-based AI agent, referred to as AIDARES) provides central coordination and decision functionalities among communication networks 50. Decisions (instructions) are distributed between the remaining network nodes 10, 20 and the central node 30. In this way, the latency of spectrum assignments can be minimized. Additionally, the topology of the aggregated communication network 1 allows cooperative distributed learning which will progressively improve latency due to sensing and decision times.

A critical element of the system is the determination of the optimum level of authority (degree of autonomy) and decision capability of each network node. Depending on factors such as latency, interference, and traffic demand, the system will operate in a range from fully distributed decisions (where each communication network and/or each network node acts independently) to fully centralized decisions (where each network and each network element operates based on recommendations provided by the central node 30).

Accordingly, the network nodes 10, 20 operate (e.g., assign portions of the frequency spectrum) in accordance with a dynamically variable level of authority (or degree of autonomy) that indicates a layer that is the lowest layer including network nodes that are allowed to, for their respective sub-branches, assign portions of a frequency spectrum to the wireless communication links between network nodes 10 in the lowest hierarchical layer and network nodes 20 in the next-to-lowest hierarchical layer. The network nodes may be likewise said to obey the level of authority (or degree of autonomy) that the aggregated communication network 1 grants them. The level of authority may be indicated by an indicator of the level of authority, which is denoted by "g" or "γ" in the present disclosure. A level of authority g=N means that only the central node 30 (at the highest layer with layer index a=N) may assign frequencies to wireless communication links. A level of authority g=1 means that network nodes at the lowest layer (a=1) as well as any network nodes in higher layers may assign frequencies to wireless communication links. In some implementations, only the central node 30 may set or adjust the level of authority. Procedures for doing so will be described in more detail below.

The level of authority (e.g., indicator g or γ) may be dynamically set for each of respective sub-branches extending from network nodes in a given layer of the aggregated communication network 1. That is, the level of authority may be set specifically for each of these sub-branches, in the sense that each of these sub-branches may have its own level of authority that all network nodes in the respective sub-branch have to obey. For example, these sub-branches may extend from the next-to-highest layer (i.e., the layer below the central node 30). In this example, the sub-branches of the aggregated communication network 1 with individual levels of authority would be the communication networks 50. It is also understood that a level of authority indicated by g=N (i.e., only the central node 30 can perform frequency assignment) would be universal for the entire aggregated communication network 1, while in all other cases, different communication networks 50 may have different levels of authority. To give a specific example thereof, the level of authority may be g=N−1 for one communication network 50, meaning that only the network node of this communication network that is in the next-to-highest layer (e.g., the NOC at a=4 for N=5) can perform frequency assignment (in addition to the central node 30). In another communication network, the level of authority may be N−3, meaning that all network nodes in the fourth highest layer (e.g., the satellites or terrestrial stations at a=2 for N=5), as well as any network nodes in higher layers can perform frequency assignment. The level of authority may be determined and set by the central node. It may be adjusted by the central node if necessary, for example in view of level of interference or resource utilization. It may be further adjusted in view of network latency or latency in assignment decisions, for example.

The system identifies an optimum operating point that distributes the level of authority between the layers of the aggregated communication network (e.g., between ground and space), in a semi-distributed way, which ensures that the latency in assignment decisions does not impact the service, while at the same time maximizing the overall system spectrum utilization. The optimum operating point may be determined by the combined Deep Reinforced Learning algorithms built into the system. It is noted that the proposed system may require only minimum changes to the existing infrastructure of network operators.

Figure 2:
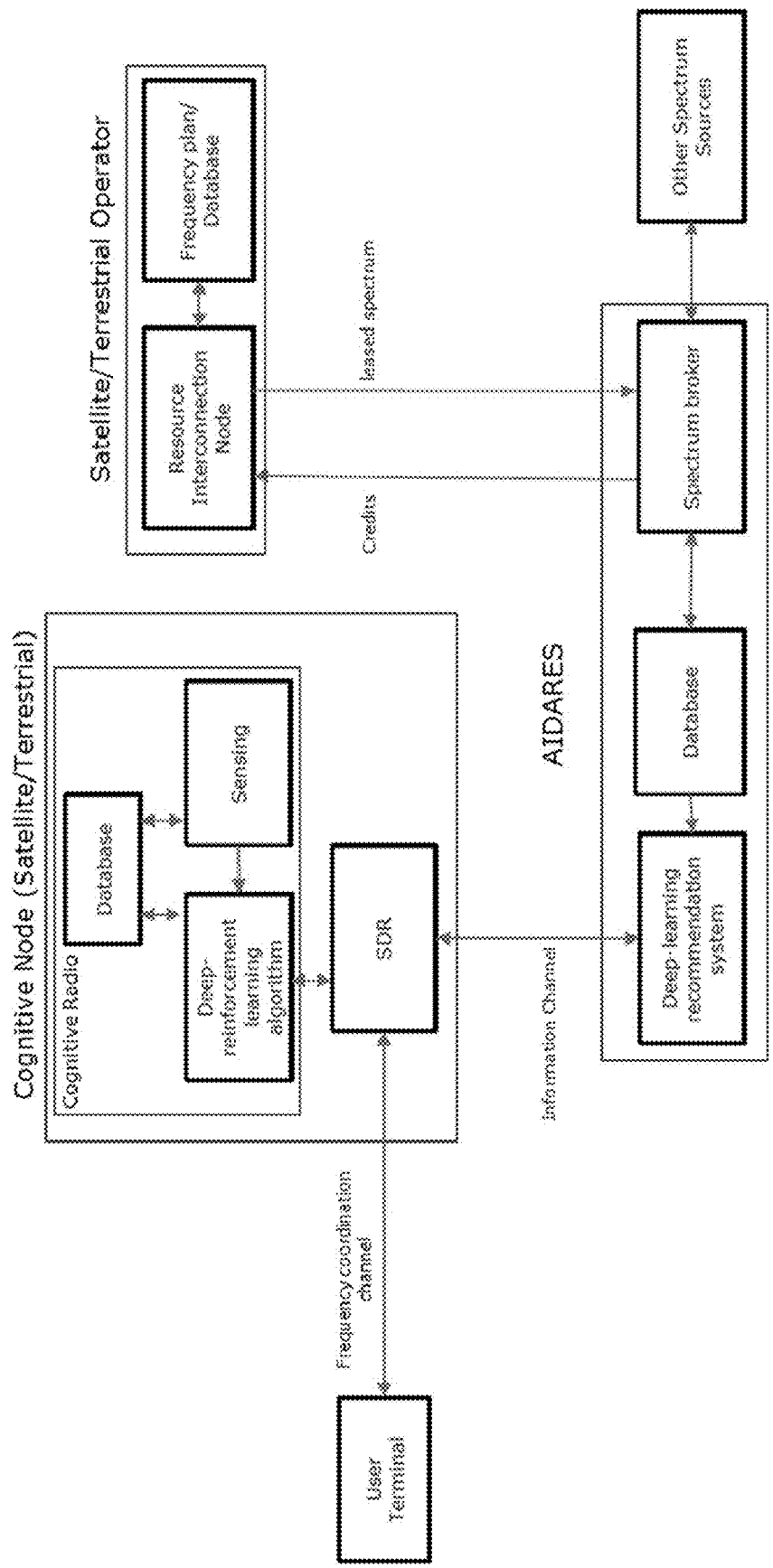
FIG. 2 is a block diagram showing an example of network elements (network nodes) of the aggregated communication network according to embodiments of the disclosure.

A block diagram illustrating examples of the main elements of the aggregated communication network 1 is schematically shown in FIG. 2. A network node 100 (e.g., user terminal) at the lowest layer of the aggregated communication network is connected to a network node 200 at the next higher layer (e.g., a satellite or terrestrial station at the next-to-lowest layer) via a communication link 101. The communication link 101 is a wireless communication link to which a portion of a frequency spectrum must be assigned. As such, the communication link 101 may be referred to as a frequency coordination channel. The network node 200 may be a cognitive node (cognitive radio node). It is in turn connected to the central node 300 (e.g., AIDARES), either directly via communication link 304, or via additional layers of the aggregated communication network. In any case, the communication path between the network node 200 and the central node 300 may be referred to as an information channel or signaling channel. This communication path may be wired, wireless, or partly wired and partly wireless in some implementations. The central node 300 may in turn communicate with one or more network operators 400 (e.g., satellite/terrestrial operators) that "own" respective communication networks and that provide portions of frequency spectrum 404 (e.g., leased spectrum) to a "pool" managed by the aggregated communication network. Each network operator 400 may comprise a resource interconnection node 401 for communication with the central node 300 and a frequency database 402 for storing information about frequencies (portions of frequency spectrum) "owned" by the respective network operator 400. In some cases, the central node 300 may provide credits 403 to the network operators 400, depending on a level of utilization of the provided portions of the frequency spectrum 404 by other communication networks within the aggregated communication network. The central node 300 may further communicate with other spectrum sources 500 that provide frequency spectrum to the pool.

As noted above, the network node 200 may be a cognitive node in the sense that it implements a set of functions that enable cooperation and cooperative learning between the network nodes of the aggregated communication network. For example, the network node 200 (or cognitive node) may be composed by the following sub-elements: a database 201, spectrum sensing functionality 202, a cognitive algorithm 203, and a Software Defined Radio (SDR) 204.

The cognitive node can be implemented at any layer of the aggregated communication network below the highest layer. A minimum requirement is that cognitive nodes are implemented at least for one layer of the aggregated communication network (e.g., the next-to-lowest layer). In some implementations, the network nodes 100 at the lowest layer of the aggregated communication network may not be implemented by cognitive nodes. In the above example for N=5, at least the satellites and terrestrial base stations (at a=2), as well as the satellite gateways (at a=3) may be implemented by cognitive nodes. In some other implementations, at least some, if not all of, the network nodes 100 at the lowest layer are implemented by cognitive nodes as well.

The database 201 of the cognitive node includes the necessary spectrum information required for performing frequency assignment (e.g., spectrum information required by the cognitive node to operate independently and to assign the correct frequencies).

The spectrum sensing functionality 202 (as embodied, for example, by a respective software module or unit, such as a spectrum sensing module) of the cognitive node allows to monitor the spectrum that is used over a given area, with a given coverage and periodicity. The functionality may scan a given area and produce time-location stamped (x, y, z, t) measurements (e.g., time-location stamped measurement reports). These measurements may be used to feed the cognitive algorithm 203, for example.

As noted above, network nodes in at least one layer of the aggregated communication network may have this functionality. Thus, network nodes in at least one layer of the aggregated communication network may be capable of measuring frequency environments of the respective network node and to generate respective measurement reports. These frequency environments may correspond to the spectrum that is used at the location of the respective network node. For example, the frequency environments may relate to Traffic Utilization Reports (TURs) for the location of the respective network node. Each TUR provides information on spectrum utilization (e.g., in the form of frequency assignments) in a specific area/the area of the network node generating the TUR) for a specific time (the time at which the TUR is generated). As such, the TUR may be a function of time, frequency, and space, e.g., TUR=$\Sigma$(time, frequency, space). Measuring a network node's frequency environment may thus generally relate to measuring levels of utilization in each relevant portion (e.g., frequency sub-band) of the frequency spectrum at the network node's location. The measurement reports may relate to a given location or area and/or a given time (e.g., time of day, etc.).

Measurement reports obtained in this way may be forwarded through the aggregated communication network, from lower layers to higher layers, up to the central node. The information that is forwarded towards the central node in this context may be referred to as first information. Accordingly, the network nodes of the aggregated communication network may each provide first information relating to measured frequency environments based on measurement reports of network nodes in lower layers in their respective sub-branch, and, if available, further based on their own measurement report. This first information is provided to the network node in the next higher layer that is connected with the respective network node. By this flow of items of first information from lower layers towards higher layers, the central node receives measurement reports from any network node that are capable of generating such measurement reports. It is important to note that even network nodes that are not implemented by a cognitive node still provide measurement reports from lower-layer network nodes in their sub-branch to the next higher layer, in the form of an item of first information. In this sense, each network node may compile its own item of first information based on items of first information received from the network nodes at the next lower layer that are connected with the respective network node, and, if available, on the network node's own measurement. As noted above, the measurement reports (and thereby, the first information) may be location-stamped and/or time-stamped.

The cognitive algorithm 203 operating in the cognitive node may be based on a machine-learning algorithm (e.g., a deep-reinforcement learning algorithm or model), The cognitive radio implemented by the cognitive node may make operational decisions to select the available frequency bands and other operational parameters. This algorithm may be fed by the user traffic requests (e.g., requests from the network nodes at the lowest layer of the aggregated communication network, such as frequency requests) to determine a portion of the frequency spectrum for assignment to a wireless communication link. Inputs to the cognitive algorithm 203 may come from the spectrum sensing module 202, and in particular from the central node's recommendation system to be described later. The policy function of the cognitive algorithm 203 may be linked to the outputs of the recommendation system. Notably, knowledge acquired in one cognitive node is distributed to the rest of cognitive nodes through the aggregated communication network, thereby enabling cooperative learning. This is achieved by the flows of the first and second information (described below) through the aggregated communication network.

The SDR 204 synthesizes an RF waveform according to the characteristics determined by the cognitive algorithm 203, such as frequency bands, modulation, coding, power control, beam forming, etc., for communication with the network node 100 via the wireless communication link.

Notwithstanding the above example, it is noted to be sufficient for the cognitive node to be able to perform its functionalities—such as measuring its frequency environment and forwarding measurement reports to higher-layer network nodes—and that it shall not be construed as being limited to any specific structural implementations.

The central node 300 (e.g., cloud-based AI-driven agent or AI DARES) may be a cloud-based system that gathers information about the frequency status of frequency bands used by operators 400 and other spectrum sources 500 made available to the aggregated communication network, and distributes relevant information to the applicable network nodes (e.g., cognitive nodes) 200. The central node 300 interconnects the multiple communication networks that participate in the shared use of frequency spectrum, as illustrated for example in FIG. 1.

For example, the central node 300 may be composed by the following sub-elements: a recommendation system 301, a database 302, and possibly a spectrum broker module 303.

The recommendation system 301 may be an AI-based Deep Learning recommendation system (e.g., implementing a machine-learning-based model), for example. In some implementations, the AI-based Deep Learning recommendation system may relate to or involve content-based methods implemented by deep learning algorithms, for example. The recommendation system 301 provides spectrum assignment recommendations to the various network elements. These recommendations may be based on any measurement reports (e.g., first information) that is received by (or otherwise available to) the central node 300.

In general, these recommendations may be said to relate to a status of utilization of portions of a frequency spectrum and/or to recommendations for utilizable portions of the frequency spectrum. The status of utilization of portions of a frequency spectrum and/or to recommendations for utilizable portions of the frequency spectrum may be location-dependent. For example, the same portion of the frequency spectrum may have different levels of utilization for different (spatially separated) locations, and/or different recommendations for utilizable portions of the frequency spectrum may apply to different (spatially separated) locations. In this sense, the recommendations may relate to, or comprise a location-dependent utilization map and/or location-dependent map for recommendable portions of the frequency spectrum. The recommendations may be generated by the central node 300 (e.g., by the recommendation system 301) based on items of first information (including measurement reports from lower layers) received at the central node 300. In addition to items of first information, the central node 300 may also receive external information from other sources, such as frequency range constraints from regulatory databases, for example.

In line with the above, generating the recommendations (e.g., second information) by the central node (e.g., by the recommendation system 301) may involve determining (e.g., generating) a frequency and location dependent map of resource utilization based on the items of first information received at the central node, and to generate the second information based on the frequency-location-dependent map. The map may be further dependent on time, in the sense that it captures a history of earlier frequency and location dependent maps and/or an extrapolation to future frequency and location dependent maps.

For example, the central node may build and maintain a dynamic global mapping (e.g., 5D mapping: frequency, location, time) based on the received items of first information (e.g., measurement reports or TURs) and possibly other information available to the central node. By this map, spectrum usage is mapped geographically and in real time. The mapping may be a function of time, frequency, and location, e.g., Global 5D Mapping=$\Sigma$(time, frequency, space).

The second information is provided by the central node 300 to network nodes in the next-to-highest layer that are connected with the central node (e.g., the NOCs). Moreover, recommendations provided by the central node 300 to the next-to-highest layer may be forwarded through the aggregated communication network, from higher layers to lower layers, for example down to the lowest layer. The information that is forwarded towards the lower layers in this context may be referred to as second information. In this sense, the second information may include location-dependent (and possibly time-dependent) indications of status of utilization of portions of the frequency spectrum and/or location-dependent (and possibly time-dependent) recommendations for utilizable portions of the frequency spectrum.

In accordance with the above, the network nodes of the aggregated communication network may each receive an item of second information from respective network nodes in the next higher layer that are connected with the respective network node, and provide items of second information to network nodes in the next lower layer that are connected with the respective network node, based on the received second information. This may entail both simply relaying the second information (e.g., recommendations) as well as generating modified versions of the recommendations for the next lower layer, for example by stripping (omitting) information relating to spectrum portions and/or locations that are not relevant for the intended recipient network nodes of the second information.

In this sense, parts of the second information may be specific, or the second information may include specific subsets, for respective communication networks or sub-branches of communication networks. For example, information that is not relevant to a given network node may relate to locations for which wireless communication at these locations cannot cause interference to the given network node (e.g., remote locations from the given network node). In any case, the items of second information that are provided to lower layer network nodes by a given network node are based on the item of second information that is received at the respective network node. For example, each network node may generate its own item of second information for its sub-branch based on the second information received from the next higher layer.

By this flow of items of second information from higher layers towards lower layers, the network nodes receive spectrum information not only from lower-layer network nodes in their own sub-branches, but effectively from all network nodes of the aggregated communication network (or in some cases, at least network nodes that could in principle cause interference to the respective network node). Having available this information (e.g., the first information and the second information) enables meaningful training of machine-learning-based models/algorithms implemented in the network nodes and further enables the network nodes to participate in a collaborative learning scheme.

Returning to FIG. 2, The database 302 of the central node 300 may contain internally and externally sourced information related to system spectrum assignments. For example the database 302 may store information on available (e.g., pooled) frequency spectrum or information on a minimum QoS required by respective communication networks.

The spectrum broker module 303 may manage spectrum allocations to various communication networks, possibly including a rewards mechanism for inter-network assignment credits in some cases.

Notwithstanding the above example, it is noted to be sufficient for the central node 300 to be able to perform its functionalities—such as receiving the measurement reports from lower-layer network nodes and generating the second information—and that it shall not be construed as being limited to any specific structural implementations. The central node 300 may also be configured to determine a suitable value for the level of authority and to dynamically set the level of authority g to the determined value. This may be based on the first information available to the central node. For example, the determination of the value of the level of authority g by the central node may be based on the frequency and location dependent map of resource utilization generated/maintained by the central node. It may be further based on a latency of frequency assignment decisions in some implementations.

Figure 3:
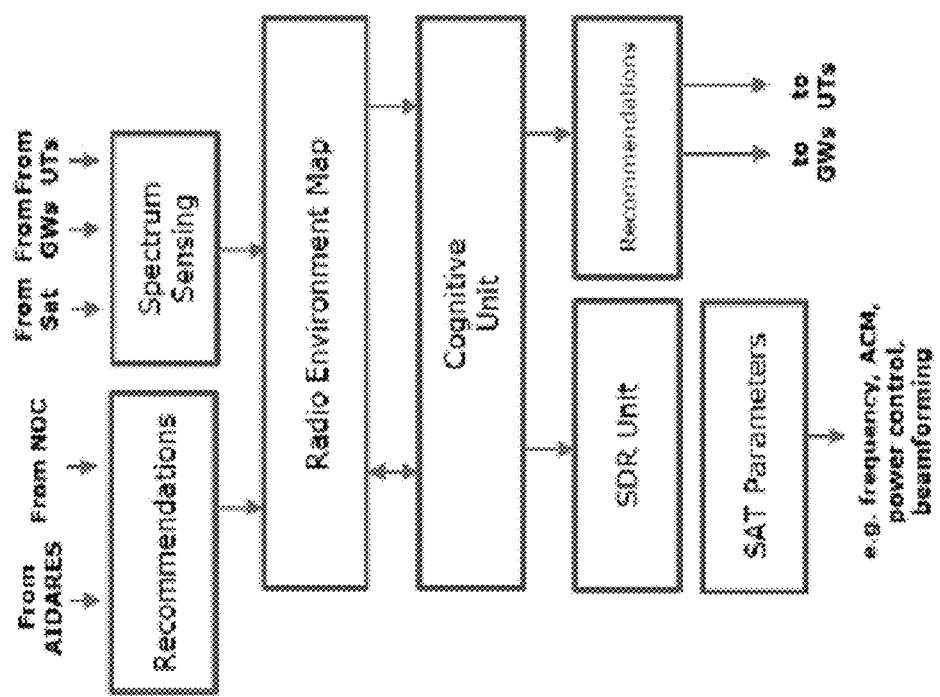
FIG. 3 is a block diagram showing an example of a network element in FIG. 2, according to embodiments of the disclosure.

FIG. 3 shows a block diagram illustrating an example of the network node 200, assuming that it is implemented by a satellite (satellite transmitter). It also shows interfaces to and from other network elements (network nodes).

In this example, the network node 200 (which may be implemented by a cognitive node) receives recommendations 210 for spectrum assignment from the next higher layer, together with spectrum sensing information 220. The spectrum sensing information 220 may relate to measurement reports (first information) from network nodes in lower layers, as well as the present network node's 200 own measurements. The recommendations 210 and the spectrum sensing information 220 can be used to derive a radio environment map 230 for the network node 200. The cognitive algorithm 203 uses the input information to derive portions of the frequency spectrum that it can assign to a wireless link in its sub-branch. In the present example, the wireless link may be between the network node 200 itself and a terrestrial user terminal. The cognitive algorithm 203 further uses the input information to derive recommendations 260 for spectrum assignment for the next lower layer. The cognitive algorithm 203 may input the outcome of the frequency assignment to an SDR unit 250, which determines appropriate SAT parameters 270. The SAT parameters 270 may include, for example, frequency parameters, Adaptive Coding and Modulation (ACM) parameters, power control parameters, and beamforming parameters.

Figure 4:
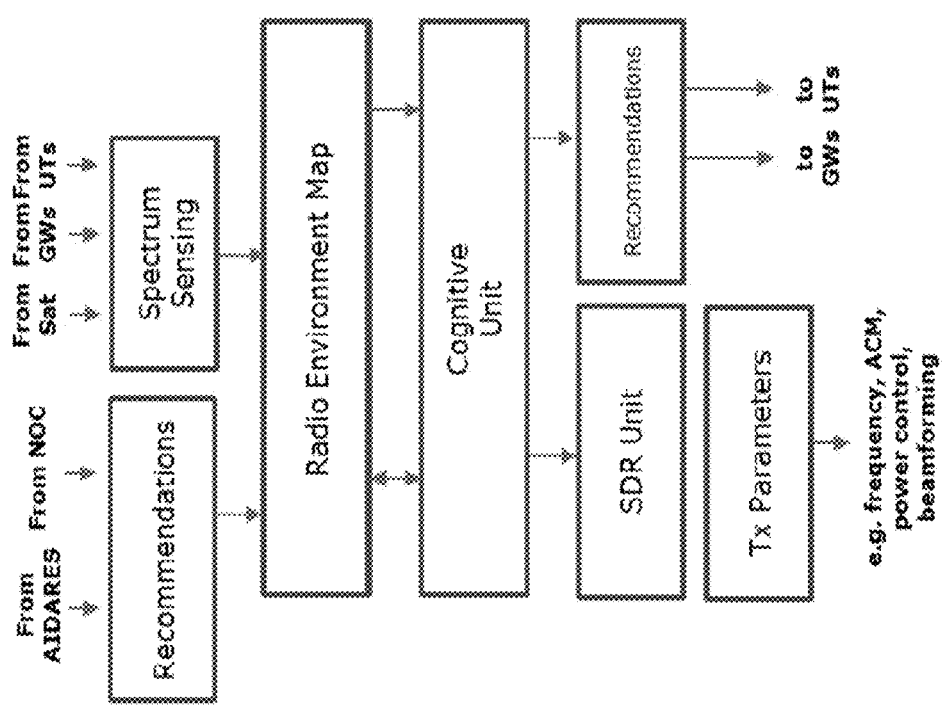
FIG. 4 is a block diagram showing another example of a network element in FIG. 2, according to embodiments of the disclosure.

FIG. 4 shows a block diagram illustrating an example of the network node 200, assuming that it is implemented by a terrestrial station. It also shows interfaces to and from other network elements (network nodes). The terrestrial station may relate to a satellite gateway or a terrestrial cellular base station, for example. Elements of the network node 200 (which may be implemented by a cognitive node) correspond to that of the network node 200 in FIG. 3, except for that the SAT parameters 270 are now replaced by TX parameters 275, which may however include the same kind of parameters as stated above.

Figure 5:
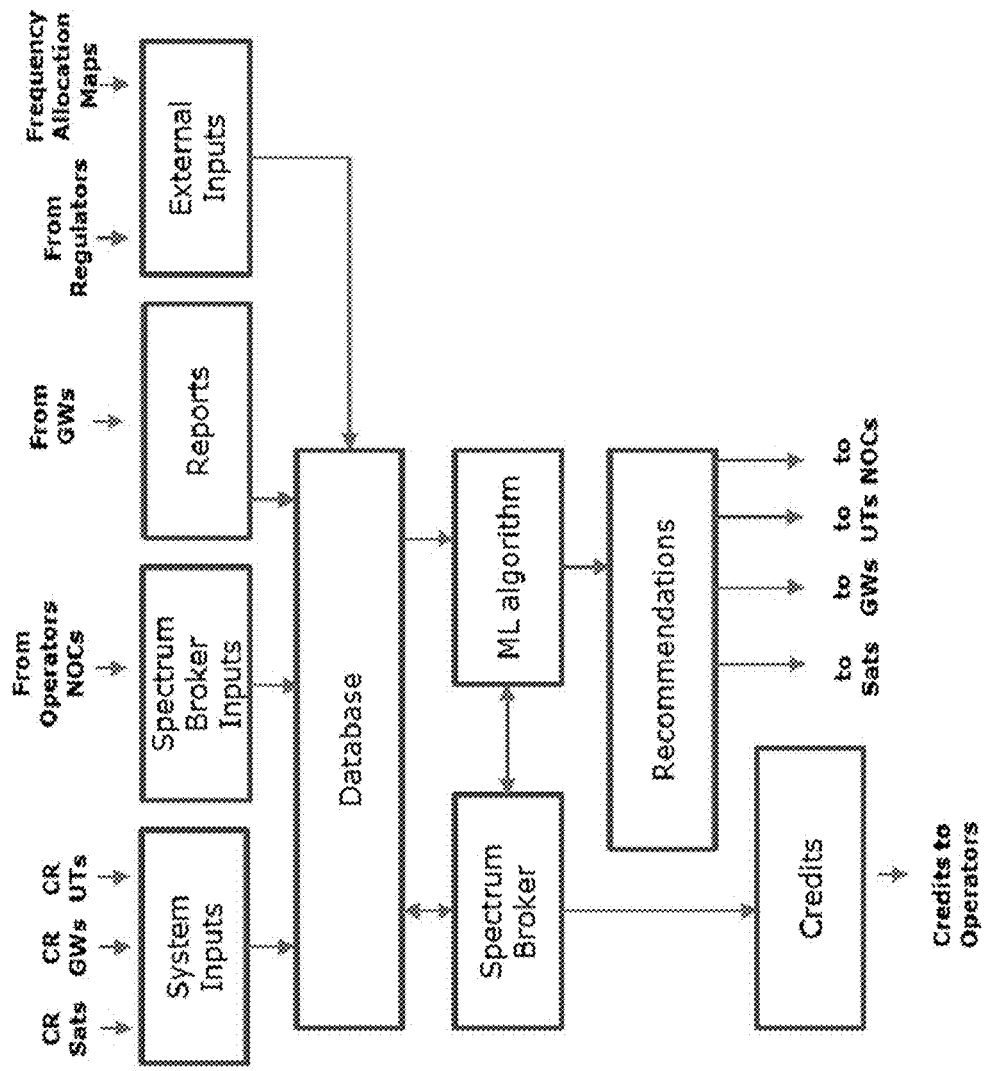
FIG. 5 is a block diagram showing an example of a central node in FIG. 2, according to embodiments of the disclosure.

FIG. 5 shows a block diagram illustrating an example of the central node 300 (e.g., AIDARES). As noted above, the central node 300 comprises a database 302 handled by several artificial intelligence algorithms. The main element of the central node 300 represents a deep learning-based recommendation system 301, which is connected to all the cognitive radio nodes (e.g., cognitive radio nodes of the space segment and terrestrial networks) through the signaling channels 304, for example to satellite links via operator gateways. The central node 300 and all its subcomponents may be located in a cloud server in a data center.

In this example, the central node 300 receives system inputs 310 from lower layers (e.g., first information). It may further receive either or both of reports 330 from gateways and external inputs 340, for example from regulators, as well as in some cases spectrum broker inputs 320 from spectrum brokers. The external inputs 340 may include frequency allocation maps, which may be taken into consideration when generating the second information. The aforementioned inputs may be fed to the database 302, which is connected to the recommendation system 301 (implementing a machine-learning-based algorithm). The recommendation system 301 generates the aforementioned recommendations 360 (e.g., second information) for the lower-layer network nodes (e.g., satellites or terrestrial stations, gateways, user terminals, and/or network operation centers). The database 302 may be further connected to the spectrum broker module 303, which may determine the credits 403 that shall be provided to the network operators 400 in some cases.

Notably, spectrum managed by the system (e.g., aggregated communication network) can either be:
 New spectrum assignments 500 coordinated by the system to be used by any operator compliant to the proposed system
 Existing spectrum under license to operators, made available to the system (e.g., leased in exchange of a fee) through the resource interconnection node 401.

FIG. 6 shows a specific example of an aggregated communication network according to embodiments of the disclosure. The aggregated communication network in this example is composed of two communication networks, a satellite-based communication network (in the right half of the figure) and a terrestrial communication network (in the left half of the figure). Each of them is linked, via its respective network operation center (satellite NOC 200-1 and terrestrial NOC 200-2) to the central node 300 (e.g., AIDARES). Each communication network has respective uplink (UL) and downlink (DL) frequency links. Further, signaling links are provided between the central node 300 and the various network elements (network nodes). In some implementations, these signaling links are not direct links, but may involve other network elements. For example, a signaling link from the central node 300 to a network node two layers below the central node 300 may be relayed through a network node in the layer below the central node 300. The satellite-based communication network in this example comprises a satellite gateway 200-3 and a satellite (satellite transmitter) 200-4. The satellite 200-4 (wirelessly) communicates with a user terminal 100-1 that has a satellite antenna through an uplink frequency link UL1 and a downlink frequency link DL1. The satellite 200-4 (wirelessly) communicates with the satellite gateway 200-3 through an uplink frequency link UL3 and a downlink frequency link DL4. The terrestrial communication network in this example comprises two terrestrial base stations (e.g., cellular base stations) 200-5. One of the terrestrial base stations 200-5 communicates with a user terminal 100-2 (e.g., a cellular mobile phone) through an uplink frequency link UL2 and a downlink frequency link DL2. The terrestrial base stations 200-5 communicate with each other through an uplink frequency link UL4 and a downlink frequency link DL4.

FIG. 7 shows the same aggregated communication network as FIG. 6 and additionally shows possible instances of inter-system interference IUL, IDL. For example, a base station 200-5 of the terrestrial communication network may face interference IDL1 from the satellite 200-4. Likewise, a user terminal 100-2 of the terrestrial communication network may face interference IDL1 from the satellite 200-4. The satellite 200-4 in turn may face interference IUL2 from the user terminal 100-2. A user terminal 100-1 of the satellite-based communication network may face interference IDL2 from the base station 200-5 and interference IUL2 from a user terminal 100-2 of the terrestrial communication network. The base station 200-5 in turn may face interference IUL1 from the user terminal 100-1 of the satellite-based communication network, and the user terminal 100-2 of the terrestrial communication network may face interference IUL1 from the base station 100-1 of the satellite-based communication network. The satellite gateway 200-3 may face interference IUL4 and IDL4 from the base stations 200-5. The base station 200-5 in turn may face interference IUL3 from the satellite gateway 200-3.

Having the functionalities described above, the central node and the remaining network nodes of the aggregated communication network according to embodiments of the disclosure may interact to ensure an optimized assignment (frequency assignment) of portions of frequency spectrum to wireless communication links. The aim of the system is to operate with different degrees of autonomy and control (as indicated by the level of authority) in order to:

Minimize global system interference (min $\Sigma s_i$) where $s_i$ is the system interference for each communication network i within the aggregated communication network, and Maximize global system spectrum efficiency (max $\Sigma SE_i$) where $SE_i$ is the Spectrum Efficiency for each communication network i.

The system may further seek to minimize intra-system interference within each communication network i.

The network nodes of the aggregated communication network obey the level of authority g (or equivalently, γ) that is set (enforced) by the central node. This level of authority g indicates the lowest hierarchical layer of the aggregated communication network that may perform independent assignments of portions of frequency spectrum to wireless communication links. Any network nodes in this layer and in higher layers may make such assignment; any network nodes in lower layers may not make such assignment.

An appropriate value for the level of authority g is determined and set (e.g., via respective instruction messages to lower layers) by the central node. The determination of the appropriate value may be performed using a machine-learning-based model or algorithm (e.g., as part of the aforementioned recommendation system). This machine-learning-based model may be trained over time (which may imply maintaining a suitable database for the machine-learning-based-model) and may use the first information available at the central node as input. Moreover, the machine-learning-based model may be based on an optimization criterion (e.g. cost function) for the frequency resource utilization, intra-system interference, and inter-system interference. This optimization criterion may also be used in the process of training of the machine-learning-based model, and/or in collaborative learning.

To be able to determine an appropriate portion of frequency spectrum for a frequency assignment, the network nodes can refer to the items of first information (e.g., the measurement reports, or TURs) and the items of second information (e.g., recommendations for utilizable portions of frequency spectrum) that are available at the respective network node. Further, the determination may be based on an optimization criterion for joint optimization of frequency resource utilization and level of interference that would result from an assignment of the determined portion of frequency spectrum to the intended wireless communication link. The level of interference that is considered by the network nodes may relate to a level of intra-system interference (e.g., within the communication network including the wireless communication link) and inter-system interference (e.g., between the communication network including the wireless communication link and other communication networks of the aggregated communication network). In this sense, the network node may seek to jointly optimize frequency resource allocation, intra-system interference, and inter-system interference. Joint optimization may relate to, for example, maximizing resource utilization (spectral efficiency) while still maintaining a certain level of Quality of Service (QoS). To this end, each communication network in the aggregated communication network may have a certain QoS that it requires as a minimum. The optimization criterion may involve a cost function, for example. The optimization criterion or cost function may also be used in the process of training the machine-learning-based model, and/or in collaborative learning.

The actual determination of the portion of frequency spectrum for assignment may be performed, at the respective network node, using a machine-learning-based model. A respective machine-learning-based model may be implemented in each network node (including the central node). Each machine-learning-based model may be trained over time (which may imply maintaining a suitable database for the machine-learning-based-model) and may use the first information and/or second information as input. Moreover, each model may be based on an optimization criterion (e.g. cost function) for the frequency resource utilization, intra-system interference, and inter-system interference. This optimization criterion may be used in the process of training and/or collaborative learning.

Upon necessity to assign a portion of the frequency spectrum to a given wireless communication link between a network node in the lowest layer and a network node in the next-to-lowest layer, a network node whose sub-branch includes the given wireless communication link may determine a portion of the frequency spectrum for assignment to the given wireless communication link based on the first information and the second information available at that network node. Having determined a suitable portion of the frequency spectrum, the network node may further assign the portion of the frequency spectrum to the given wireless communication link. This may proceed via direct assignment (e.g., by appropriately instructing the network node in the lowest layer and/or by adjusting own transmission/reception parameters) if the network node is connected to the network node in the lowest layer through the given wireless communication link, or indirectly, by appropriately instructing lower-layer network nodes, for example via respective instruction messages.

In the above, the lowest-layer network node seeking to determine a portion of the frequency spectrum for assignment to the given wireless communication link may be present in the layer indicated by the level of authority g. In fact, the first network node attempting a determination of the portion of frequency spectrum for assignment to the given wireless communication link may be that network node that is present in the hierarchical layer indicated by the level of authority g and whose sub-branch includes the given wireless communication link. If the level of authority g indicates the lowest layer, the first network node attempting the determination may be the network node in the lowest layer that is connected to a network node in the next-to-lowest layer through the given wireless communication link. In any case, the first network node attempting a determination of the portion of frequency spectrum for assignment to the given wireless communication link may be present in the layer indicated by the level of authority g, in a sub-branch of the aggregated communication network that includes the wireless communication link to which a frequency assignment shall be made.

If the aforementioned first network node attempting the determination finds (e.g., determines) that it cannot identify a portion of the frequency spectrum for assignment to the given wireless communication link, it passes a request for assignment of a portion of the frequency spectrum to the given wireless communication link to the network node in the next higher layer that is connected to that network node. Thereby, the task of assigning a portion of the frequency spectrum to the given wireless communication link is passed up to higher layers of the aggregated communication network until a network node whose sub-branch includes the given wireless communication link determines that it can identify a portion of the frequency spectrum for assignment to the given wireless communication link (e.g., has sufficient information for deciding on the portion of the frequency spectrum for assignment to the given wireless communication link).

The above determination and assignment of portions of frequency spectrum occurs under supervision by the central node of the aggregated communication network. In this context, the central node may override frequency assignments by lower-layer network nodes and it may adjust the value of the level of authority g for the aggregated communication network or parts of the aggregated communication network.

For example, the central node may assess a level of interference and determine whether to override any assignment of a portion of frequency spectrum to a wireless communication link performed by a network node at a layer below the highest layer, based on a result of the assessment. The assessment may further consider a spectral efficiency. Also the determination as to whether an override is necessary may be performed by a/the machine-learning-based model of the central node (e.g., implemented by the aforementioned recommendation system). The level of interference (and/or spectral efficiency) that is assessed/determined it this point may be the level of interference (and/or spectral efficiency) for a given portion of the frequency spectrum and/or for a given location. To this end, the central node may refer to the items of first information received from network nodes at lower layers. The assessment may be performed, among other instances, upon (i.e., in response to) assignment of a portion of the frequency spectrum to a wireless communication link performed by a network node at a layer below the highest layer.

If a specific assignment of a portion of the frequency spectrum to a given wireless communication link performed by a network node at a layer below the highest layer is subject to override by the central node, the central node may itself determine a portion of the frequency spectrum for assignment to the given wireless communication link (e.g., using the machine-learning-based model/algorithm), and assign said portion of the frequency spectrum to the given wireless communication link. This assignment may proceed via appropriate instruction messages to lower-layer network nodes.

As another example, the central node may assess a level of (inter-system and intra-system) interference and determine whether to maintain the currently set value of the level of authority g based on a result of the assessment. The assessment may further consider a spectral efficiency and/or a latency of frequency assignment decisions. Then, if the currently set value of the level of authority is found as not appropriate and shall not be maintained (e.g., because it turns out to result in unacceptably high levels of interference, unacceptably low levels of spectral efficiency, and/or unacceptably high latency), the central node may determine a new value of the level of authority (for the whole aggregated communication network or parts thereof) based on the items of first information available (e.g., received) at the central node. The new value of the level of authority g may then be communicated to the network nodes at layers below the highest layer by appropriate instruction messages indicative of the new value of the level of authority g. Therein, the level of interference (and/or spectral efficiency) may be assessed/determined for a given portion of the frequency spectrum and/or for a given location. To assess/determine the level of interference (and/or spectral efficiency), the central node may refer to the items of first information received from network nodes at lower layers. The assessment may also be based on the frequency and location dependent map of resource utilization that is generated by the central node. The aforementioned assessment may be performed, among other instances, upon (i.e., in response to) assignment of a portion of the frequency spectrum to a wireless communication link performed by a network node at a layer below the highest layer.

One example for an adjustment of the value of the level of authority g is the following. If the central node finds that frequency assignments by lower-layer network nodes lead to an increased amount of (inter-system or intra-system) interference, it may decide that a more centralized frequency assignment is advisable and may increase the value of the level of authority g accordingly (possibly up to the point where only the central node can decide on frequency assignments).

Next, ladder diagrams illustrating examples of actions of network nodes and information flows between network nodes of the aggregated communication network in line with the above scheme(s) will be described with reference to FIG. 8 to FIG. 16. These ladder diagrams assume an example of an aggregated communication network with five hierarchical layers (N=5). The central node (e.g., AIDARES) in this example is located in the highest layer (a=5). Each communication network of the aggregated communication network has a respective network operation node or network operation center (NOC) that is located in the next-to-highest layer (a=4) and is connected to the central node. In the layer below the NOCs (a=3), the ladder diagrams assume gateways (satellite gateways) that communicate with satellites (satellite transmitters) at the next lower layer (a=2). The satellites in turn communicate with user terminals at the lowest layer (a=1). In some implementations, the next-to-lowest layer (a=2) may include terrestrial stations in addition to, or instead of, the satellites.

It is to be noted that these ladder diagrams refer to the user terminal, satellite, gateway, network operation center, and AIDARES (the central node) as mere examples of the network nodes, without intended limitation, and that other types of network nodes could be assigned to respective layers in some implementations.

Figure 8:
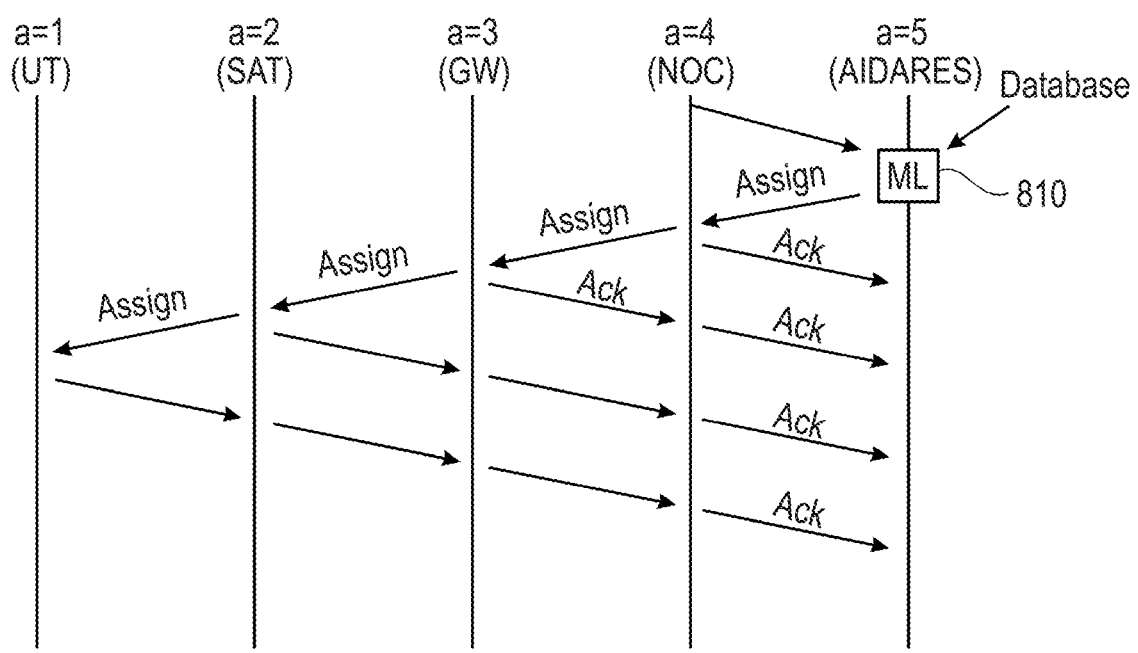

FIG. 8 relates to an initial spectrum assignment (frequency assignment) by the central node to the network nodes (network elements). It is understood that the actual assignment of frequencies is to wireless communication links between network nodes and that the terms "assignment to a network node" and "assignment to a wireless communication link" can be used interchangeably. The box ML 810 indicates a machine-learning-based algorithm or model that is implemented, in this case, by the central node. The central node (e.g., by the machine-learning-based algorithm or model) determines a portion of frequency spectrum for assignment to a given wireless communication link (between layers a=1 and a=2) and communicates this assignment to the lower-layer nodes via appropriate instruction messages ("Assign") that are relayed through the aggregated communication network down to the network nodes that are connected by the given wireless communication link. The determination and assignment may proceed as described above. The lower-layer network nodes may acknowledge the assignment instructions via respective acknowledgement messages ("Ack").

Figure 9:
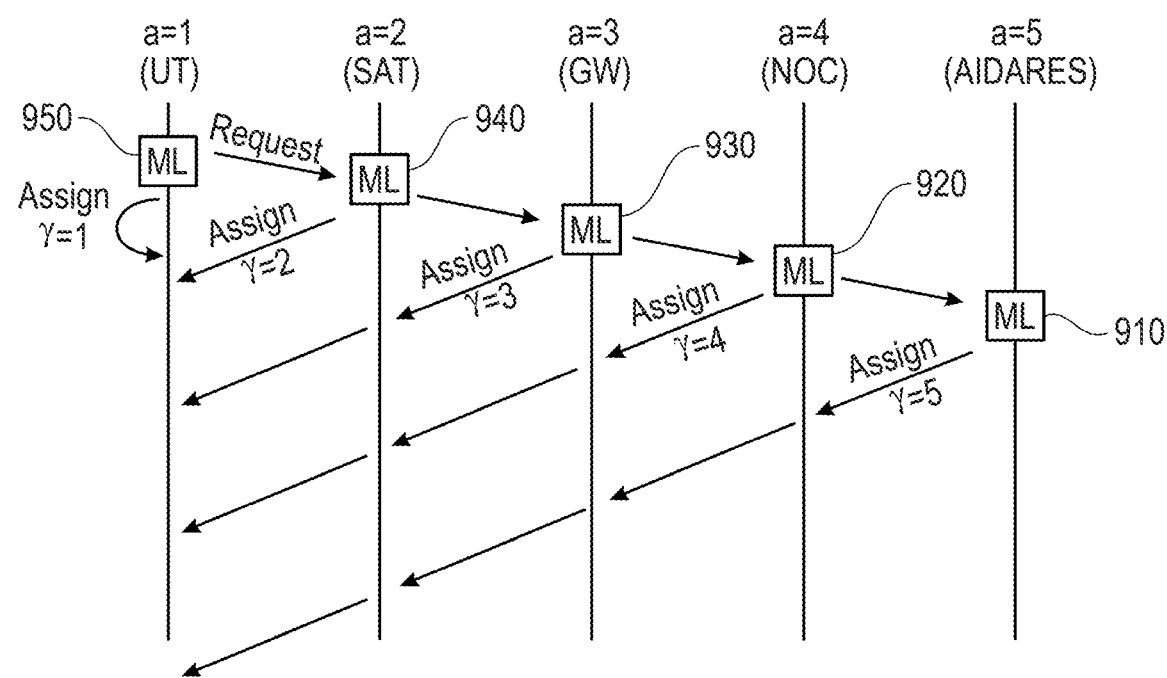

FIG. 9 relates to possible cases of spectrum assignment in response to a request (frequency request) initiated by a user terminal. The parameter $\gamma$ (or equivalently, g), which is (an indicator of) the value of the level of authority, indicates the various operation modes regarding the degree of autonomy allocated to each network node. The range for $\gamma$ in the present example is between $\gamma=1$ and $\gamma=5$ (or between $\gamma=1$ and $\gamma=N$ in general), where $\gamma=1$ represents a fully decentralized approach where the UT (i.e., the network node in the lowest layer) makes independent decisions (as regards frequency assignment), and $\gamma=5$ represents a fully centralized approach, where the assignment is ruled by the central node (e.g., AIDARES). Boxes ML 910, 920, 930, 940, 950 indicate machine-learning-based algorithms or models that are implemented by respective network nodes. For the extreme case of $\gamma=5$, the central node (e.g., machine-learning-based algorithm/model 910) performs a frequency assignment to the wireless communication link and communicates the assignment to lower-layer network nodes through appropriate instruction messages that are relayed through the aggregated communication network. For the other extreme case of $\gamma=1$, the UT (e.g., machine-learning-based algorithm or model 950) attempts the frequency assignment, and, if successful, performs the frequency assignment. Otherwise, it passes a request for frequency assignment to the next higher layer, and so forth.

Figure 10:
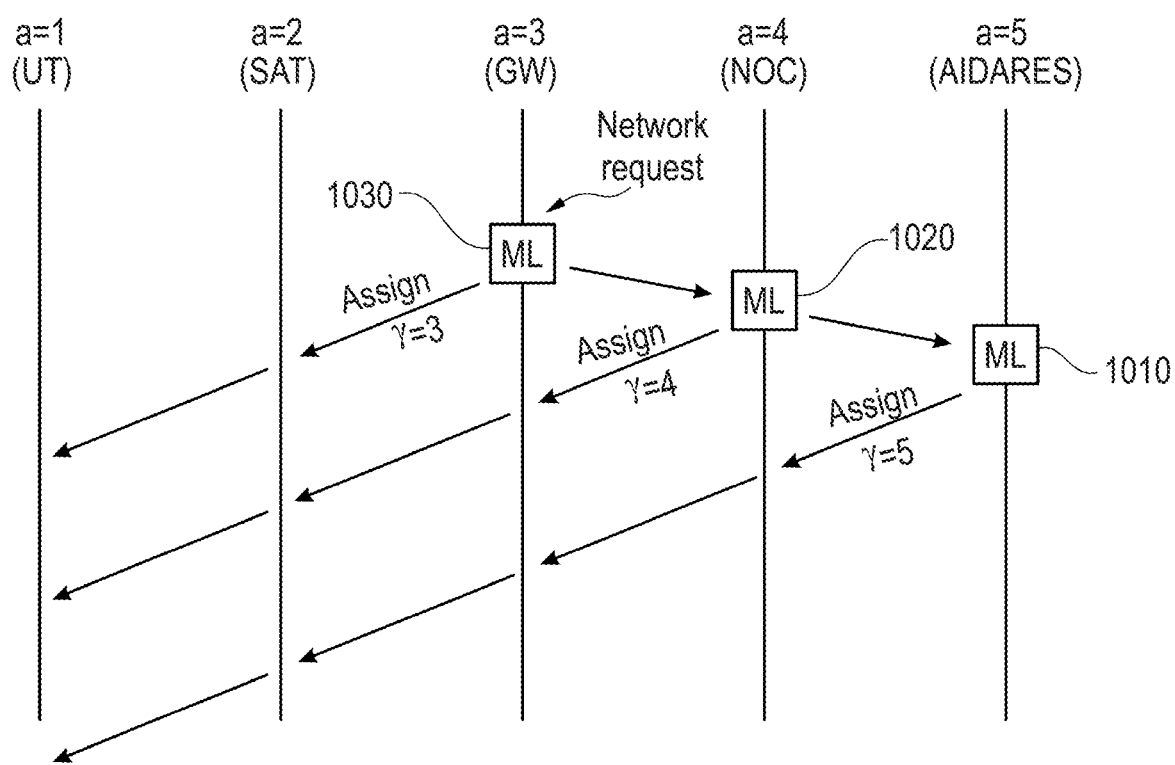

FIG. 10 relates to possible cases of spectrum assignments in response to a request ("Network request") initiated by a network node at a=3 (e.g., gateway, GW) or a network node at a=4 (network or network operation center, NOC). The parameter $\gamma$ (or equivalently, g) again indicates the various operation modes with regard to the degree of autonomy allocated to each network node. The range for $\gamma$ in this example is between $\gamma=3$ and $\gamma=5$, where $\gamma=3$ represents a decentralized approach where the network node at a=3 (e.g., gateway) makes independent decisions, and $\gamma=5$ represents a fully centralized approach, where the assignment is ruled by the central node (e.g., AIDARES). Boxes ML 1010, 1020, 1030 indicate machine-learning-based algorithms or models that are implemented by respective network nodes. A request for assignment ("Network request") is received at the network node (e.g., gateway) at a=3. For $\gamma=3$, the gateway could in principle perform the frequency assignment. However, it determines in this example that it cannot perform the frequency assignment (e.g., due to lack of information or since it cannot identify a suitable portion of frequency spectrum) and issues a request to the network node in the next higher layer. The network node in the next higher layer can again either perform the frequency assignment ("Assign $\gamma=3$"), or issue a request to the network node in the yet next higher layer (e.g., the network operation center). For $\gamma=4$, the network operation center could in principle perform the frequency assignment ("Assign $\gamma=4$"). However, it determines in this example that it cannot perform the frequency assignment (e.g., due to lack of information or since it cannot identify a suitable portion of frequency spectrum) and issues a request to the central node. If $\gamma=5$ or if the central node has received a request for frequency assignment, the central node determines and assigns a portion of the frequency spectrum ("Assign $\gamma=5$").

Figure 11:
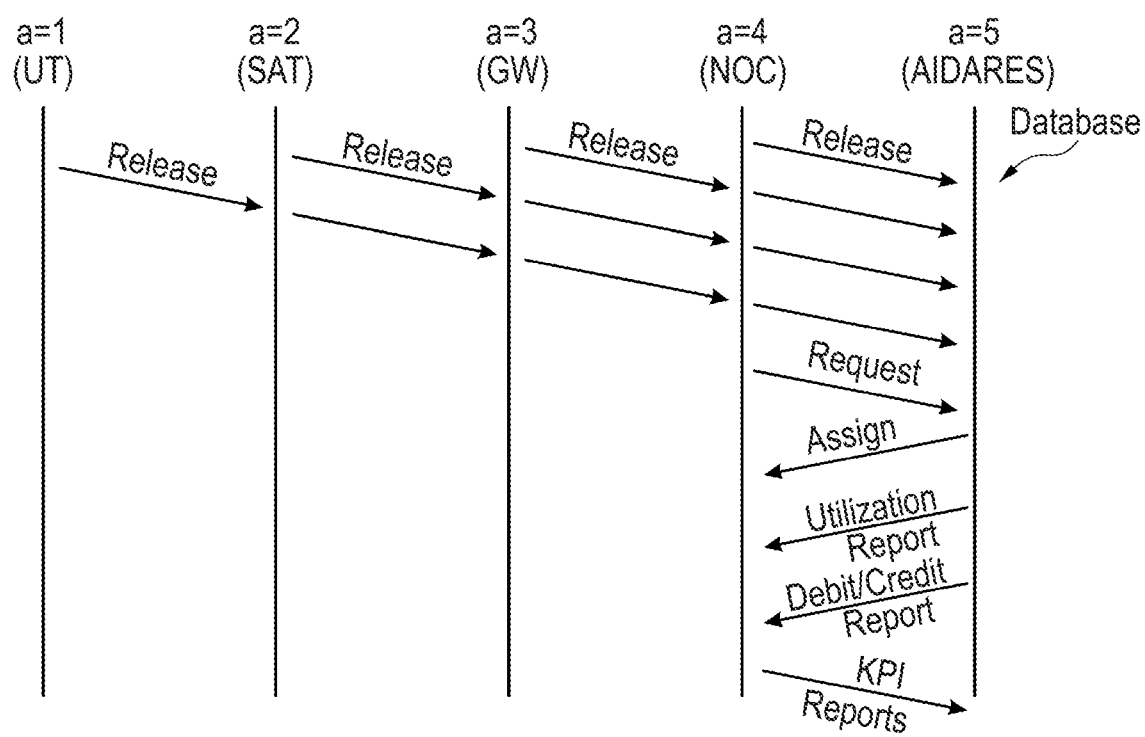

FIG. 11 relates to examples of frequency management scenarios. The upper half of the ladder diagram illustrates the spectrum release ("Release") from various network nodes via the network nodes at a=4 (e.g., network operation center) to the central node (e.g., AIDARES). The released spectrum will be reallocated to the pool of available spectrum and can be used for future frequency assignments. A release of portions of frequency spectrum (e.g., for a certain location or area) may be reflected in the frequency and location dependent map of resource utilization generated by the central node, and thereby, in the recommendations (e.g., second information) that are issued by the central node to lower-layer nodes. The lower half of the ladder diagram illustrates various frequency management and coordination exchanges between the network node at a=4 (e.g., network operation center) and the central node (e.g., AIDARES).

Figure 12:
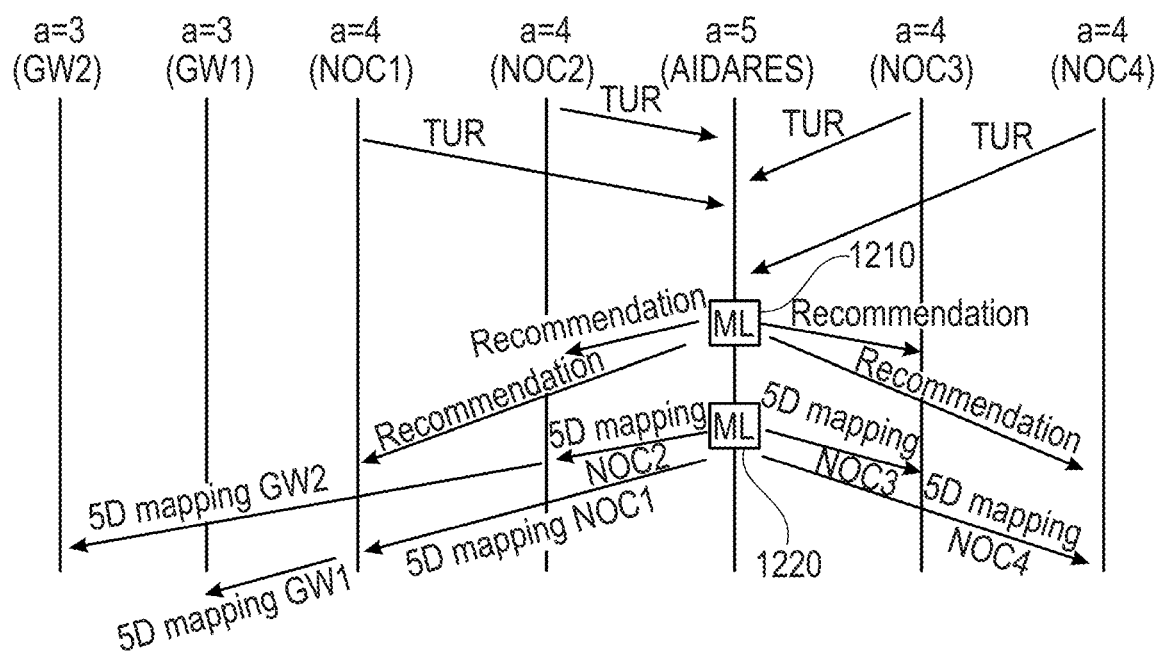

FIG. 12 shows Traffic Utilization Reports (TURs) from various network operation centers (i.e., from various communication networks) to the central node (e.g., AIDARES). It also shows the broadcast of assignments and recommendations from the central node to the several communication networks. Boxes ML 1210, 1220 indicate machine-learning-based algorithms or models that are implemented by respective network nodes. The TURs are examples of measurement reports from the lower-layer network nodes. The central node may use the received TURs (possibly together with additional information) to generate and maintain the aforementioned frequency and location dependent map of resource utilization.

Based on the received TURs and possibly other available information, the central node builds and maintains a dynamic global 5D mapping, where spectrum usage is mapped geographically and in real time. As noted above, the TURs provide spectrum utilization in the forms of frequency assignments in specific areas for a specific time. In response to the TURs, the central node produces the 5D global mapping. The aim of the overall system is to operate with different degrees of autonomy and control in order to minimize global system interference (min $\Sigma s_i$) where $s_i$ is the system interference for each communication network i, and maximize global system spectrum efficiency (max $\Sigma SE_i$) where $SE_i$ is the Spectrum Efficiency for each network i. The system may further seek to minimize intra-system interference within each communication network i.

Figure 13:
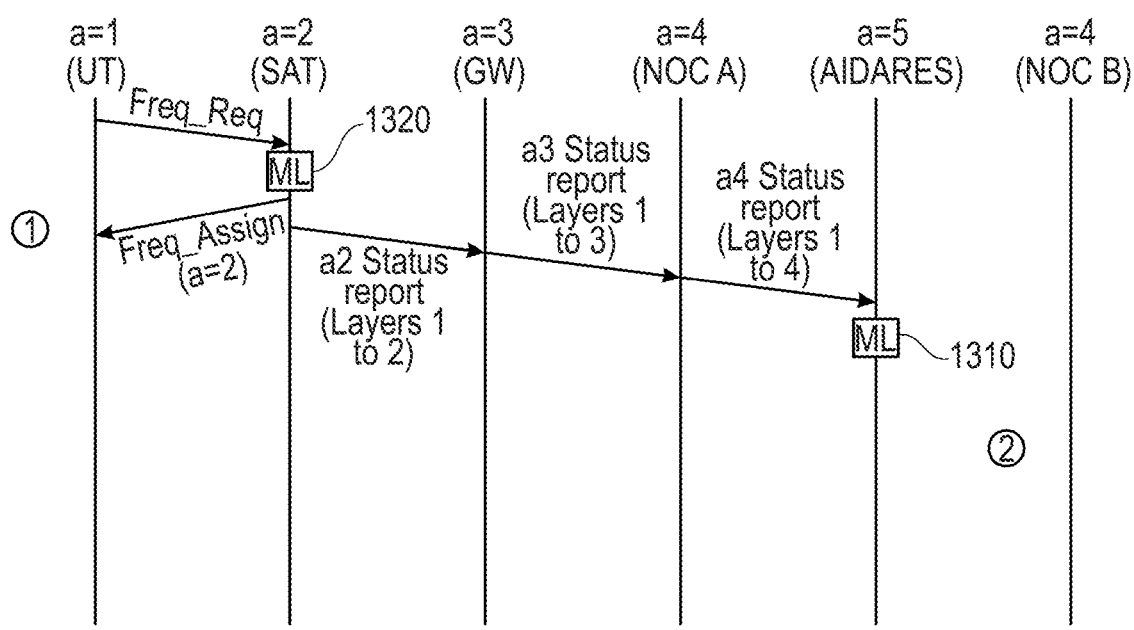

FIG. 13 relates to a satellite-initiated frequency assignment for g=2. Boxes ML 1310, 1320 indicate machine-learning-based algorithms or models that are implemented by respective network nodes. The user terminal in the lowest layer (a=1) issues a request ("Freq_Req") for frequency assignment to the satellite in the next-to-lowest layer (a=2), with which it communicates over a wireless communication link. At (1), the machine-learning-based algorithm/model 1320 of the satellite determines that it can identify a portion of frequency spectrum for assignment to the wireless communication link between the user terminal and the satellite (e.g., determines that it has enough information for performing the frequency assignment to the wireless communication link). Since the value of the level of authority, g=2, allows the satellite to perform the frequency assignment, it determines an appropriate portion of frequency spectrum for assignment and assigns it to the wireless communication link ("Freq_Assing (a=2)"). Further, the satellite issues a status report ("a2 status report") to the next higher layer, the gateway (a=3) issues a status report ("a3 status report") to the next higher layer, and the network operation center (a=4) issues a status report ("a4 status report") to the central node. These status reports may relate to the first information described above (e.g., measurement reports or TURs) and each relate to the respective reporting layer and any lower layers. At (2), the machine-learning-based algorithm/model 1310 of the central node computes the frequency and location dependent map of resource utilization (e.g., 5D mapping) and determines, based on the map, that it is safe to continue with the current value of the level of authority g (i.e., g=2). This decision may involve an assessment of the level of interference and/or spectral efficiency, for example based on the map.

Figure 14:
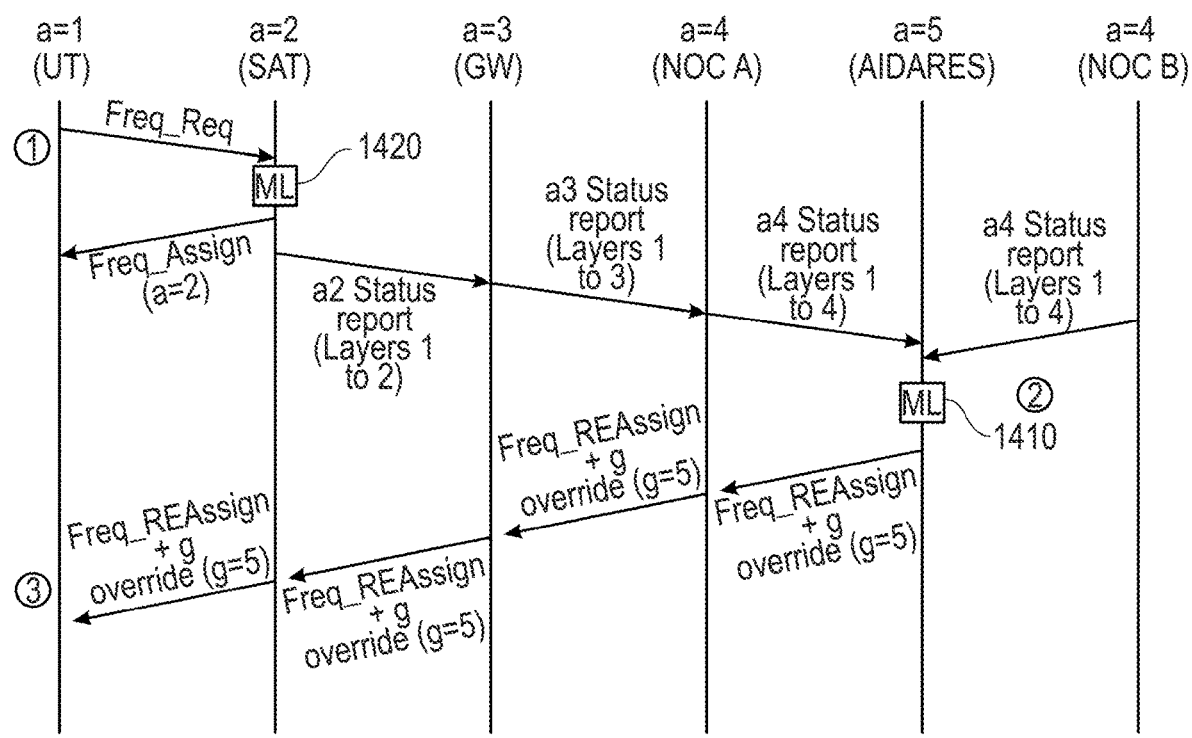

FIG. 14 relates to a satellite-initiated frequency assignment for g=2 that is overridden by the central node, followed by an enforcing of a value of the level of authority of g=5 by the central node. Boxes ML 1410, 1420 indicate machine-learning-based algorithms or models that are implemented by respective network nodes. The user terminal in the lowest layer (a=1) issues a request ("Freq_Req") for frequency assignment to the satellite in the next-to-lowest layer (a=2), with which it communicates over a wireless communication link. At (1), the machine-learning-based algorithm/model 1420 of the satellite determines that it can identify a portion of frequency spectrum for assignment to the wireless communication link between the user terminal and the satellite (e.g., determines that it has enough information for performing the frequency assignment to the wireless communication link). Since the value of the level of authority, g=2, allows the satellite to perform the frequency assignment, it determines an appropriate portion of frequency spectrum for assignment and assigns it to the wireless communication link ("Freq_Assing (a=2)").

Further, the satellite issues a status report ("a2 status report") to the next higher layer, the gateway (a=3) issues a status report ("a3 status report") to the next higher layer, and the network operation center (a=4) issues a status report ("a4 status report") to the central node. The central node further receives a status report ("a4 status report") from another communication network of the aggregated communication network. These status reports may relate to the first information described above (e.g., measurement reports or TURs) and each relate to the respective reporting layer and any lower layers. At (2), the machine-learning-based algorithm/model 1410 of the central node computes the frequency and location dependent map of resource utilization (e.g., 5D mapping) and based on the map, detects a potential temporal-spatial-spectral overlap that requires to override the frequency assignment by the satellite and to take control of the frequency assignment for the wireless communication link. The machine-learning-based algorithm/model 1410 of the central node in this example further determines that the value of the level of authority g should be raised to g=5, indicating centralized frequency assignment by the central node. This decision may involve an assessment of the level of interference and/or spectral efficiency, for example based on the map. At (3) the central node then issues an appropriate instruction message ("Freq-REAssign+g override (g=5)") that is relayed by the lower-layer network nodes.

Figure 15:
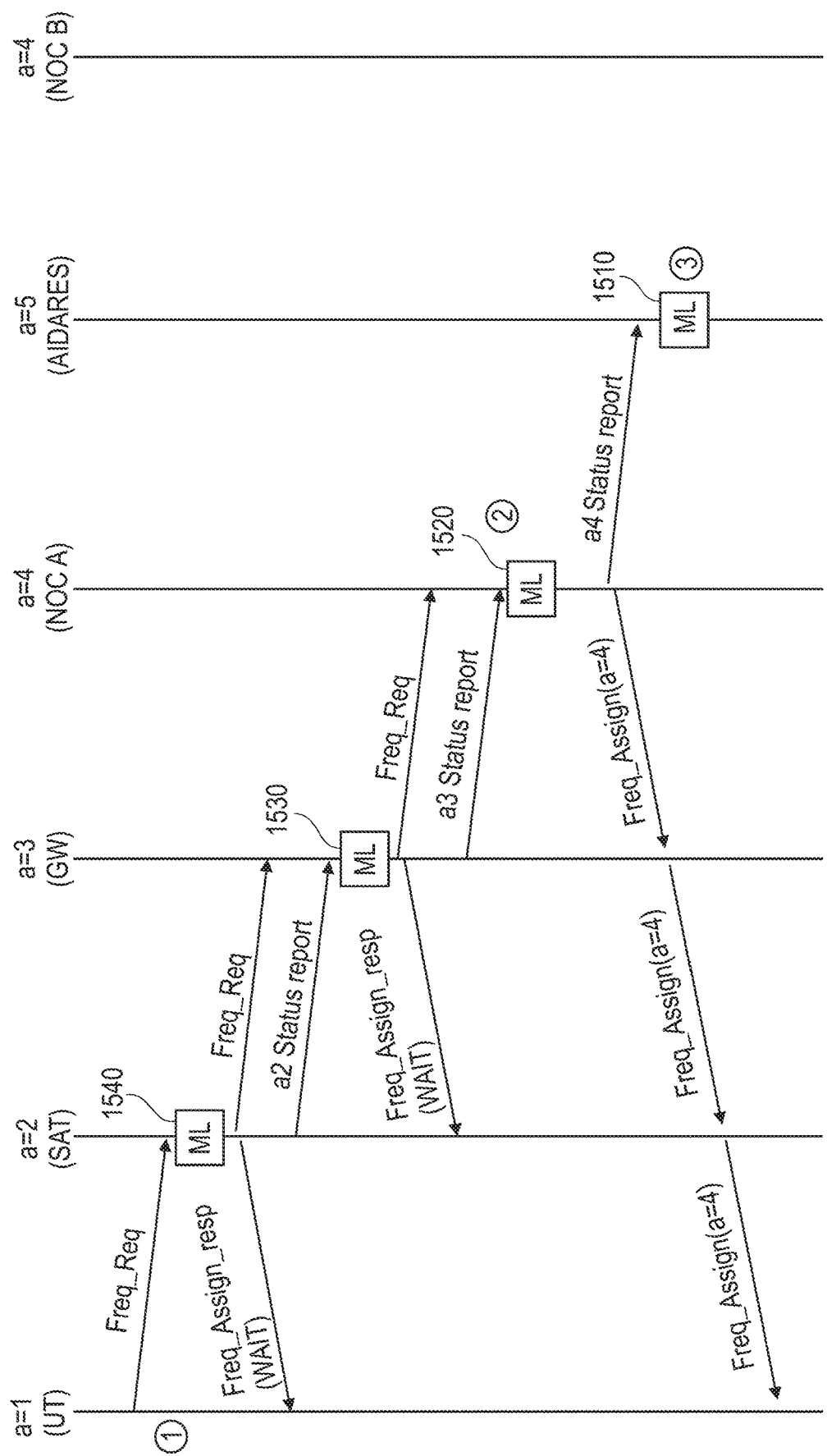

FIG. 15 relates to frequency assignment by the network node at layer a=4 (e.g., the NOC) for g=2, when it is determined by network nodes at layers a=2 and a=3 (e.g., the satellite and the satellite gateway) that they cannot perform a frequency assignment. Boxes ML 1510, 1520, 1530, 1540 indicate machine-learning-based algorithms or models that are implemented by respective network nodes. The user terminal in the lowest layer (a=1) issues a request ("Freq_Req") for frequency assignment to the satellite in the next-to-lowest layer (a=2), with which it communicates over a wireless communication link. At (1), the machine-learning-based algorithm/model 1540 of the satellite determines that it does not have sufficient information on available resources for assignment (e.g., cannot identify a portion of frequency spectrum for assignment). Accordingly, it issues a request for frequency assignment ("Freq_Req") to the next higher layer, a=3 (e.g., to the satellite gateway), together with a status report ("a2 status report"). At the same time, the satellite issues a message to the user terminal that a frequency assignment is not yet possible ("Freq_Assig_resp (WAIT)"). The machine-learning-based algorithm/model 1530 of the satellite gateway likewise determines that it does not have sufficient information on available resources for assignment (e.g., cannot identify a portion of frequency spectrum for assignment). Accordingly, it issues a request for frequency assignment ("Freq_Req") to the next higher layer, a=4 (e.g., to the network operation center), together with a status report ("a3 status report"). At the same time, the satellite gateway issues a message to the satellite that a frequency assignment is not yet possible ("Freq_Assig_resp (WAIT)"). At (2), the machine-learning-based algorithm/model 1520 of the network operation center determines that it has enough information for performing the frequency assignment to the wireless communication link between the user terminal and the satellite. Since the value of the level of authority, g=2, allows the network operation center to perform the frequency assignment, it determines an appropriate portion of frequency spectrum for assignment and assigns it to the wireless communication link. A respective instruction message ("Freq_Assing (a=4)") may be relayed by the lower-layer network nodes. Further, the network operation center issues a status report ("a4 status report") to the central node. The central node may further receive a status report ("a4 status report") from another communication network of the aggregated communication network. Any of the aforementioned status reports may relate to an item of first information described above (e.g., measurement reports or TURs) and each relate to the respective reporting layer and any lower layers. At (3), the machine-learning-based algorithm/model 1510 of the central node computes the frequency and location dependent map of resource utilization (e.g., 5D mapping) and determines, based on the map, that it is safe to continue with the current value of the level of authority g (i.e., g=2) and that an override of the frequency assignment by the network node at layer a=4 is not necessary (i.e., that this frequency assignment shall be allowed). This decision may involve an assessment of the level of interference, for example based on the map.

Figure 16:
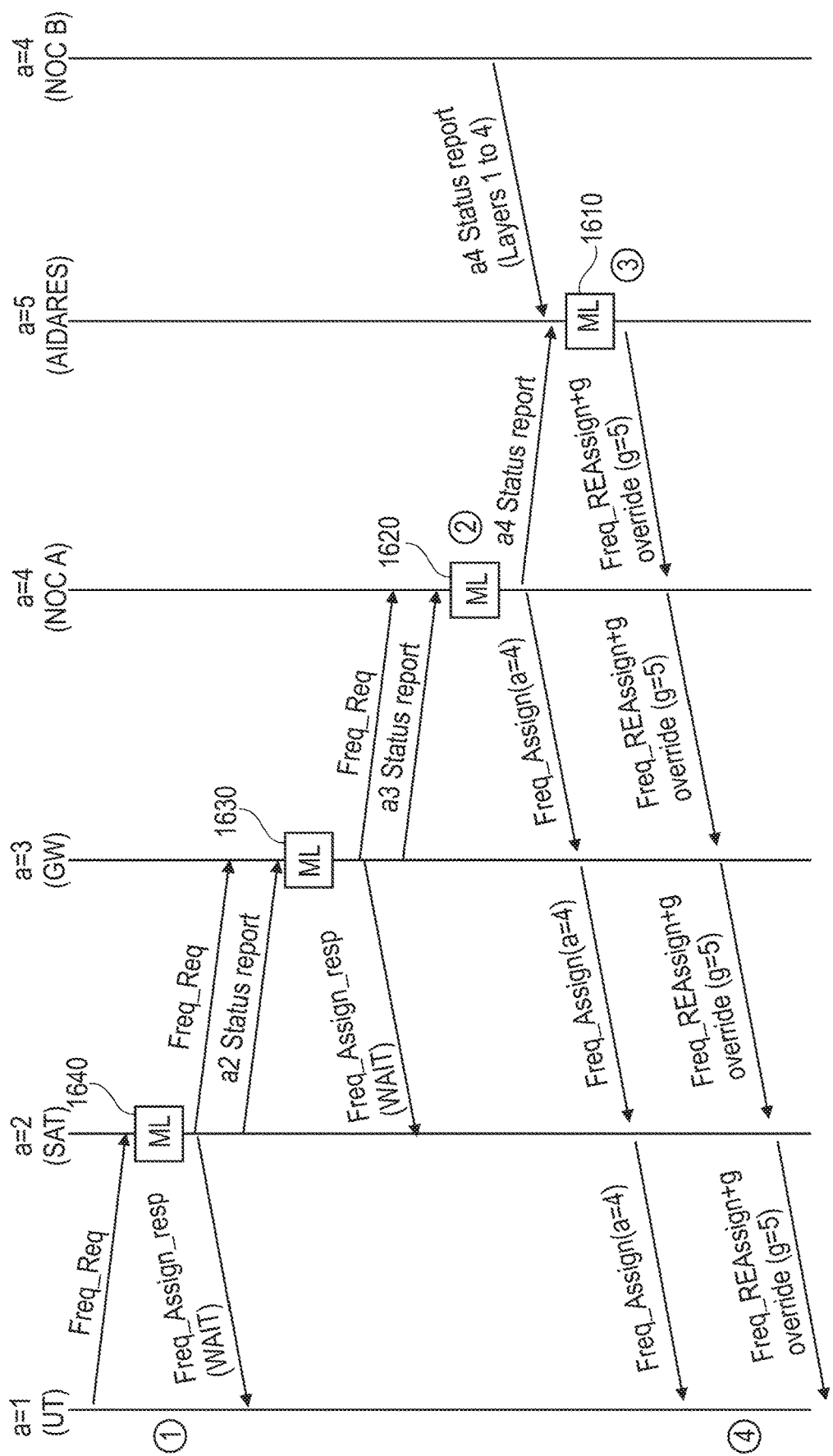

FIG. 16 relates to frequency assignment by the network node at layer a=4 (e.g., the network operation center) for g=2, when it is determined by network nodes at layers a=2 and a=3 (e.g., the satellite and the satellite gateway) that they cannot perform a frequency assignment, followed by an override and enforcing of a value of the level of authority of g=5 by the central node (e.g., AIDARES). Boxes ML 1610, 1620, 1630, 1640 indicate machine-learning-based algorithms or models that are implemented by respective network nodes. The user terminal in the lowest layer (a=1) issues a request ("Freq_Req") for frequency assignment to the satellite in the next-to-lowest layer (a=2), with which it communicates over a wireless communication link. At (1), the machine-learning-based algorithm/model 1540 of the satellite determines that it does not have sufficient information on available resources for assignment (e.g., cannot identify a portion of frequency spectrum for assignment). Accordingly, it issues a request for frequency assignment ("Freq_Req") to the next higher layer, a=3 (e.g., to the satellite gateway), together with a status report ("a2 status report"). At the same time, the satellite issues a message to the user terminal that a frequency assignment is not yet possible ("Freq_Assig_resp (WAIT)"). The machine-learning-based algorithm/model 1530 of the satellite gateway likewise determines that it does not have sufficient information on available resources for assignment. Accordingly, it issues a request for frequency assignment ("Freq_Req") to the next higher layer, a=4 (e.g., to the network operation center), together with a status report ("a3 status report"). At the same time, the satellite gateway issues a message to the satellite that a frequency assignment is not yet possible ("Freq_Assig_resp (WAIT)"). At (2), the machine-learning-based algorithm/model 1520 of the network operation center determines that it has enough information for performing the frequency assignment to the wireless communication link between the user terminal and the satellite. Since the value of the level of authority, g=2, allows the network operation center to perform the frequency assignment, it determines an appropriate portion of frequency spectrum for assignment and assigns it to the wireless communication link. A respective instruction message ("Freq_Assing (a=4)") may be relayed by the lower-layer network nodes. Further, the network operation center issues a status report ("a4 status report") to the central node. The central node further receives a status report ("a4 status report") from another communication network of the aggregated communication network. Any of the aforementioned status reports may relate to an item of first information described above (e.g., measurement reports or TURs) and each relate to the respective reporting layer and any lower layers. At (3), the machine-learning-based algorithm/model 1510 of the central node computes the frequency and location dependent map of resource utilization (e.g., 5D mapping) and based on the map, detects a potential temporal-spatial-spectral overlap that requires to override the frequency assignment by the network operation center and to take control of the frequency assignment for the wireless communication link. The machine-learning-based algorithm/model 1510 of the central node further determines that the value of the level of authority g should be raised to g=5, indicating centralized frequency assignment by the central node. This decision may involve an assessment of the level of interference and/or spectral efficiency, for example based on the map. At (4), the central node then issues an appropriate instruction message ("Freq-REAssign+g override (g=5)") that is relayed, by the lower-layer network nodes.

Figure 17:
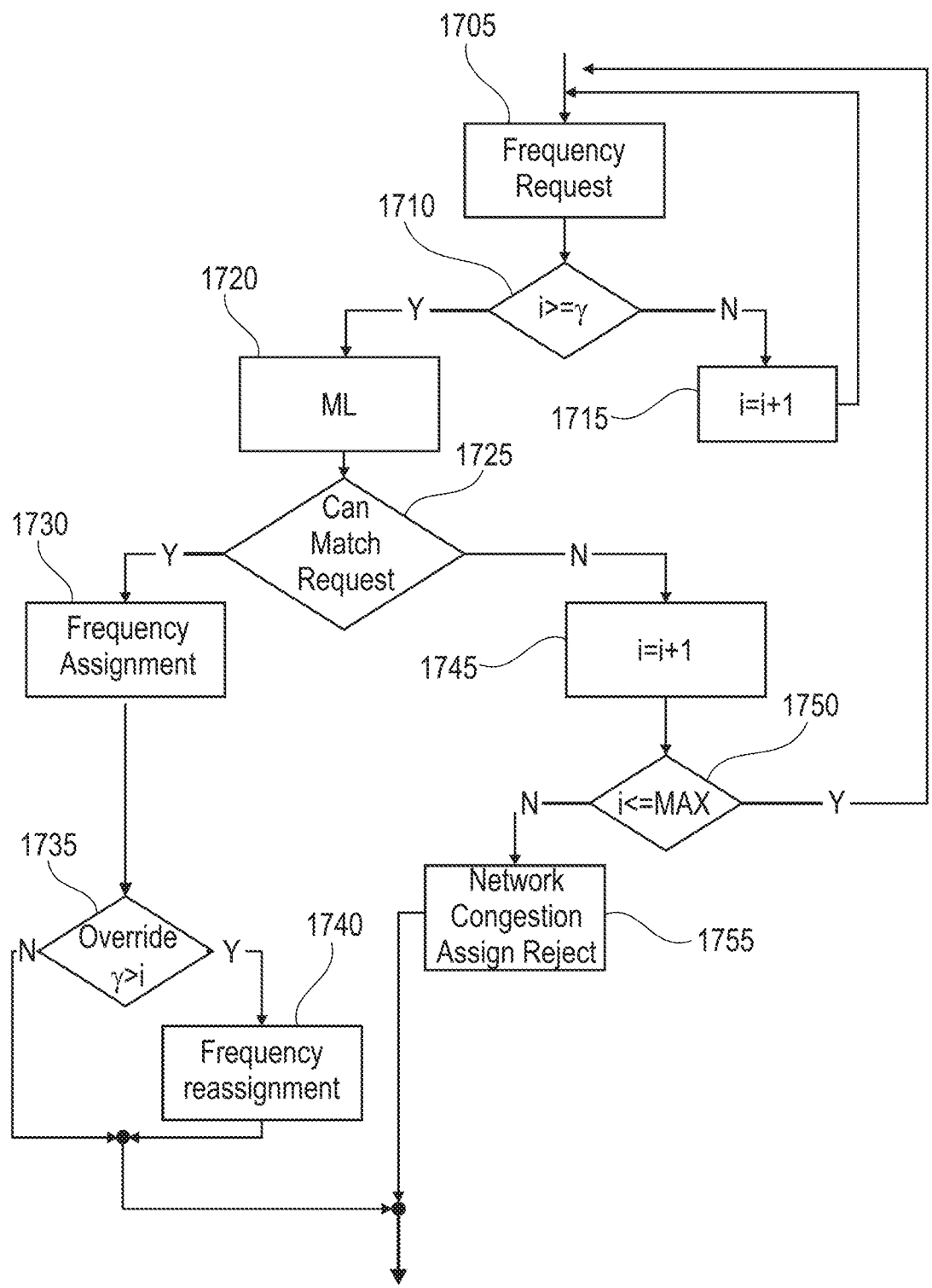
FIG. 17 illustrates an example of a decision tree or logic for frequency assignment by network nodes of the aggregated communication network, according to embodiments of the disclosure.

FIG. 17 illustrates an example of a decision tree or logic for frequency assignment by network nodes of the aggregated communication network, according to embodiments of the disclosure. This decision tree may be implemented by a method of operating an aggregated communication network, or methods of operating a network node or central node of the aggregated communication network, for example. In this figure, "i" indicates the layer index (which is also referred to as "a" at other instances of the disclosure) and γ indicates the value of the level of authority. For N (or equivalently, "MAX") hierarchical layers of the aggregated communication network, the decision tree applies for 1≤i<N, and γ may take values 1≤γ≤N. At 1705, a network node at the i-th layer receives a frequency request, i.e., a request for frequency assignment to a wireless communication link. This request may be received from a network node in the next lower layer. At 1710, the network node checks whether it has authority to perform the frequency assignment. This is the case if its layer index i is greater than or equal the value of the level of authority γ, i.e., if i≥γ. If not ("N" at 1710), the layer index i is incremented by one and the frequency request is passed to the next higher layer. If on the other hand the network node has authority to perform the frequency assignment ("Y" at 1710), the machine-learning-based algorithm/model of the network node attempts to determine a portion of frequency spectrum for assignment to the wireless link at 1720. At 1725 it is determined whether the network node can match the frequency request, i.e., succeeds in determining a portion of frequency spectrum for assignment to the wireless link. If not ("N" at 1725), the layer index i is incremented by one. If it is determined at 1750 ("Y") that the incremented layer index is smaller than or equal to the number of layers, i.e., i≤N, the frequency request is passed to the next higher layer, i.e., the layer indicated by the incremented layer index. Otherwise ("N" at 1750), a network congestion assign reject (indicating that frequency assignment in response to the frequency request is not possible) is issued at 1755 and the decision tree ends. If however the network node can match the frequency request at 1725 ("Y"), frequency assignment is performed at 1730. However, as described above, this frequency assignment is subject to control by the central node. If the central node determines that the frequency assignment shall be overridden at 1735 ("Y"), frequency re-assignment by the central node is performed at 1740. Otherwise ("N" at 1735), the decision tree ends.

Figure 18:
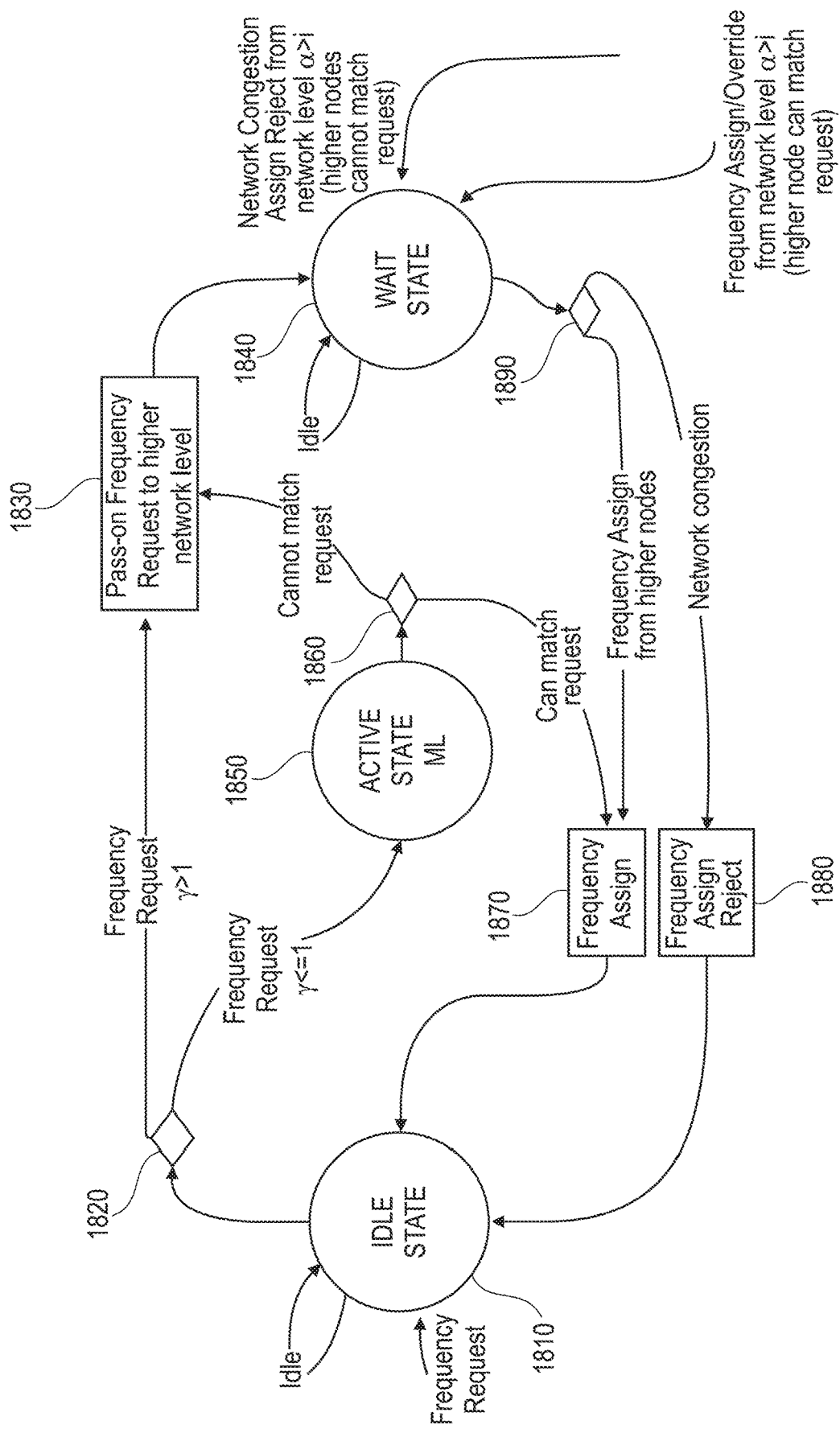
FIG. 18 shows an example of a state diagram of a network node in the aggregated communication network according to embodiments of the disclosure.

FIG. 18 shows an example of a state diagram of a network node in the aggregated communication network according to embodiments of the disclosure. Initially, the network node is in an idle state 1810. if it receives a frequency request, the network node determines at 1820 whether it has authority to perform a frequency assignment, based on whether its layer index is greater than or equal to the applicable value of the level of authority. If not, the network node passes the frequency request to the next higher layer at 1830 and goes into a wait state at 1840. It will leave the wait state 1840 upon receiving a network congestion assign reject from a higher layer (e.g., the next higher layer) or upon receiving instructions for frequency assignment from a higher layer (e.g., the next higher layer). These instructions may originate from a network node in any higher layer, noting that it will be relayed to the network node by intervening network nodes. At 1890 it is determined whether a network congestion assign reject or instructions for frequency assignment have been received by the network node. In the former case, it relays the network congestion assign reject to the next lower layer at 1880 and returns to the idle state 1810. In the latter case, the network node performs frequency assignment in accordance with the received instructions at 1870 (this may include relaying the instructions to the next lower layer) and returns to the idle state 1810. If the network node determines that it has authority to perform the frequency assignment at 1820, it enters an active state 1850 and determines at 1860 whether it can match the frequency request. This may involve using the machine-learning-based algorithm/model implemented by the network node. If it cannot match the frequency request, the network node passes the frequency request to the next higher layer at 1830 and enters the wait state 1840. If it can match the frequency request, it performs the frequency assignment at 1870 and returns to the idle state 1810.

It should also be noted that the apparatus features described above may correspond to respective method features (e.g., operating method features) that may not be explicitly described, for reasons of conciseness, and vice versa. The disclosure of the present document is considered to extend also to such methods and vice versa.

Accordingly, in addition to the aggregated communication network, the present disclosure likewise relates to the elements (nodes) of the aggregated communication network. Assuming an aggregated communication network as described above, a network node for use therein may be configured to perform respective functionalities of the network nodes as described above. Likewise, a central node for use in the aggregated communication network may be configured to perform respective functionalities of the central node as described above.

Thus, while an aggregated communication network and its network nodes in accordance with embodiments of the invention have been described above, the present disclosure likewise relates to corresponding methods of operating the aggregated communication network and its network nodes.

For example, assuming an aggregated communication network as described above, a method of operating the aggregated communication network may include the following steps: A step of measuring, by network nodes in at least one layer, frequency environments of the respective network nodes and to generate respective measurement reports. A step of generating, by the network nodes, first information relating to measured frequency environments based on measurement reports of network nodes in lower layers in their respective sub-branch, and, if available, the own measurement report for the respective network node, and providing the respective first information to a network node in the next higher layer that is connected with the respective network node. A step of generating, by the central node, second information relating to a status of utilization of portions of a frequency spectrum and/or to recommendations for utilizable portions of the frequency spectrum based on items of first information received at the central node, and providing the second information to network nodes in the next-to-highest layer that are connected with the central node. A step of receiving, by the network nodes, items of second information from respective network nodes in the next higher layer that are connected with the respective network node and providing items of second information to network nodes in the next lower layer that are connected with the respective network node, based on the received second information. A step of operating, by the network nodes, in accordance with a dynamically variable level of authority that indicates a layer that is the lowest layer including network nodes that are allowed to, for their respective sub-branches, assign portions of a frequency spectrum to the wireless communication links between network nodes in the lowest hierarchical layer and network nodes in the next-to-lowest hierarchical layer. Finally, a step of determining, upon necessity to assign a portion of the frequency spectrum to a given wireless communication link between a network node in the lowest layer and a network node in the next-to-lowest layer, by a network node whose sub-branch includes the given wireless communication link, a portion of the frequency spectrum for assignment to the given wireless communication link based on the first information and the second information available at that network node.

As another example, assuming an aggregated communication network as described above, a method of operating a network node of the aggregated communication network may include the following steps: A step of measuring a frequency environments of the network node and generating a measurement report. A step of generating first information relating to a measured frequency environment based on measurement reports of network nodes in lower layers in the sub-branch of the network node and the own measurement report of the network node, and providing the first information to a network node in the next higher layer that is connected with the network node. A step of receiving an item of second information relating to a status of utilization of portions of a frequency spectrum and/or to recommendations for utilizable portions of the frequency spectrum from a respective network node in the next higher layer that is connected with the network node, and providing items of second information to network nodes in the next lower layer that are connected with the network node, based on the received second information. A step of operating in accordance with a dynamically variable level of authority that indicates a layer that is the lowest layer including network nodes that are allowed to, for their respective sub-branches, assign portions of a frequency spectrum to the wireless communication links between network nodes in the lowest hierarchical layer and network nodes in the next-to-lowest hierarchical layer. Finally, a step of determining, upon necessity to assign a portion of the frequency spectrum to a given wireless communication link between a given network node in the lowest layer and a given network node in the next-to-lowest layer in the sub-branch of the network node, a portion of the frequency spectrum for assignment to the given wireless communication link based on the first information and the second information available at the network node.

As yet another example, assuming an aggregated communication network as described above, a method of operating the central node of the aggregated communication network may include the following step: A step of generating second information relating to a status of utilization of portions of a frequency spectrum and/or to recommendations for utilizable portions of the frequency spectrum based on items of first information received at the central node, and providing the second information to network nodes in the next-to-highest layer that are connected with the central node.

Additional steps of the aforementioned operating methods are readily derivable from the above description of the aggregated communication network and its nodes.

Next, technical results of the present disclosure will be described.

Feasibility

The present disclosure relates to a system composed of different building blocks and network elements, whose feasibility has been proven independently in various cases.

The feasibility of dynamic spectrum sharing systems has already been proven in the past. For example, TV white spaces are handled in the US and in the UK with technologies using centralized geolocation databases, and a specific IEEE air interface standard. With respect to space related systems, a test bed for demonstrating the feasibility of License Assisted Shared Spectrum (LSA) techniques, is under development.

Regarding the feasibility of cognitive radios, numerous prototypes have already been developed and software defined radios exist today, that can support spectrum-monitoring functions over a given bandwidth.

The present disclosure proposes to implement state-of-the-art machine learning techniques that will augment the capabilities of cognitive radios, provide autonomy and enable a much faster and dynamic spectrum management among different systems. The present disclosure also proposes to implement the central network entity AIDARES, to complement the intelligence of the CR nodes and provide an overall global coordination function. Inter-system and intra-system signaling channels will need to be implemented to provide the required management and control to operate the system. All of the above developments do not present particularly challenging implementation issues. Moreover, a gradual implementation strategy could be applied, where functionalities, algorithms and different operating modes can be implemented in real time, without precluding the system to operate from the beginning, even if with reduced capabilities.

Quantification of Performances

Several studies have been performed utilizing different spectrum sharing techniques, mainly in deterministic spectrum assignments and centralized operating conditions. In such studies, typical results show a system spectrum efficiency increasing by a factor of 4 to 5, meaning that spectrum can be re-used 4 to 5 times, providing a 400% to 500% improvement.

The present disclosure improves previous results as the system is dynamically adjusting its operating point. Moreover, it can support both global management and terrestrial/satellite frequency re-use. Implementing the presently proposed schemes is expected to result in spectrum efficiency increasing by a factor of at least 10 to 20, meaning that spectrum can be re-used 10 to 20 times, providing a 1000% to 2000% improvement. This would correspond to great benefits both in terms of availability of global spectrum, which would potentially accommodate several new systems and services.

It is understood that any modules, units, or blocks described above may be implemented by a computer processor or respective computer processors, or the like. Modules, units or blocks described above may further be implemented in a cloud-based manner.

It should further be noted that the description and drawings merely illustrate the principles of the proposed method and system. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method and system.

Furthermore, all statements herein providing principles, aspects, and embodiments of the invention, as well as specific examples thereof, are intended to encompass equivalents thereof.

Various aspects and implementations of the present invention may also be appreciated from the following enumerated example embodiments (EEEs), which are not claims.

EEE1. A combined satellite and terrestrial communication system (communication network), comprising at least one satellite earth station (200-3), for communication via a satellite (200-4) via feeder links (UL3, DL3), with a plurality of terminals (100-1) using one or more satellite links (UL1, DL1), and a plurality of terrestrial stations (200-5), for communication with the plurality of terminals (100-2) using one or more terrestrial user links (UL2, DL2); and a plurality of terrestrial stations (200-5) communicating among themselves using radio links (UL4, DL4), wherein at least some frequencies used in the satellite links (UL1, DL1, UL3, DL3) coincide with, and may be used simultaneously with, frequencies of the terrestrial user links (UL2, DL2), and wherein at least some frequencies used in the satellite links (UL1, DL1, UL3, DL3) coincide with, and may be used simultaneously with, frequencies of the terrestrial radio links (UL4, DL4).

EEE2. The system of EEE1, wherein the terminals (100-1) have at least one satellite antenna, for communication with the satellite (200-4), and the terminals (100-2) have at least one terrestrial antenna, for communication with the terrestrial stations (200-5), such that interference is attenuated between the satellite and terrestrial antennas.

EEE3. The system of any preceding EEE, wherein a satellite system includes a satellite uplink (UL1), for transmissions from the terminals (100-1) to the satellite (200-4), and another satellite system includes a satellite uplink (UL21), for transmissions from the terminals to the satellite, wherein at least some of frequencies of the satellite uplink (UL1) coincide with, and may be used simultaneously with, the frequencies of the satellite uplink (UL21).

EEE4. The system of any preceding EEE, wherein a satellite system includes a satellite downlink (DL1), for transmissions from the satellite (200-4) to the terminals (100-1), and another satellite system includes a satellite downlink (DL21), for transmissions from the satellite to the terminals, wherein at least some of frequencies of the satellite downlink (DL1) coincide with, and may be used simultaneously with, the frequencies of the satellite downlink (DL21).

EEE5. The system of any preceding EEE, wherein the satellite links include a satellite uplink (UL1), for transmissions from the terminals (100-1) to the satellite (200-4), and the terrestrial links include a terrestrial uplink (UL2), for transmissions from the terminals (100-2) to the terrestrial stations (200-5), wherein at least some of frequencies of the satellite uplink (UL1) coincide with, and may be used simultaneously with, the frequencies of the terrestrial uplink (UL2).

EEE6. The system of any preceding EEE, wherein the satellite links include a satellite downlink (DL1), for transmissions from the satellite (200-4) to the terminals (100-1), and the terrestrial links include a terrestrial downlink (DL2), for transmissions from the terrestrial stations (200-5) to the terminals (100-2), wherein at least some of frequencies of the satellite downlink (DL1) coincide with, and may be used simultaneously with, the frequencies of the terrestrial downlink (DL2).

EEE7. The system of any preceding EEE, wherein the satellite links include a satellite downlink (DL1), for transmissions from the satellite (200-4) to the terminals (100-1), and the terrestrial radio links include links (DL4, UL4), for transmissions between terrestrial stations (200-5), wherein at least some of frequencies of the satellite downlink (DL1) coincide with, and may be used simultaneously with, the frequencies of the terrestrial radio links (DL4, UL4).

EEE8. The system of any preceding EEE, wherein the satellite links include a satellite uplink (UL1), for transmissions from the terminals (100-1) to the satellite (200-4), and the terrestrial radio links include links (DL4, UL4), for transmissions between terrestrial stations (200-5), wherein at least some of frequencies of the satellite uplink (UL1) coincide with, and may be used simultaneously with, the frequencies of the terrestrial radio links (DL4, UL4).

EEE9. The system of any preceding EEE, wherein at least some of the terminals (100-1) are arranged to cancel, from the satellite downlink (DL1), interference (IDL2) from the terrestrial downlink (DL2), and/or some of the terminals (100-2) are arranged to cancel, from the terrestrial downlink (DL2), interference (IDL1) from the satellite downlink (DL1).

EEE10. The system of any preceding EEE, wherein the satellite (200-4), is arranged to cancel, from the satellite uplink (UL1), interference (IUL2) from the terrestrial uplink (UL2).

EEE11. The system of any preceding EEE, wherein at least one of the terrestrial stations (200-5), or a node connected thereto, is arranged to cancel, from the terrestrial uplink (UL2), interference (IUL1) from the satellite uplink (UL1).

EEE12. The system of any preceding EEE, wherein at least some satellite ground stations (200-3) are arranged to cancel, from the satellite downlink (DL3), interference (IDL4, IUL4) from the terrestrial radio links (DL4, UL4), and/or some terrestrial base stations (200-5) are arranged to cancel, from the terrestrial radio links (DL4, UL4), interference (IUL3) from the satellite uplink (UL3) and/or interference (IDL1) from the satellite downlink (DL1).

EEE13. The system of any preceding EEE, wherein at least some satellite terminals (100-1) are arranged to cancel, from the satellite downlink (DL1), interference (IUL2) from the terrestrial user terminals (100-2), and/or some terrestrial user terminals (100-2) are arranged to cancel, from the terrestrial downlink (DL2), interference (IUL1) from the satellite terminals uplink (UL1).

EEE14. The system of any preceding EEE, wherein at least some base stations (200-5) are arranged to cancel, from the terrestrial radio links (UL4,DL4), interference (IUL3) from the satellite ground station (200-3), and/or interference (IDL1) from the satellite downlink (IDL1).

EEE15. The system of any preceding EEE, wherein the channels within the satellite links are allocated independently from channels within the terrestrial links.

EEE16. The system of any preceding EEE, wherein each of the terrestrial stations (200-5) generates a plurality of beams defining different sectors.

EEE17. The system of EEE16, wherein the frequencies are re-used between each of the plurality of beams.

EEE18. The system of any preceding EEE, wherein the satellite antenna is arranged to generate one or more beams directed so as to inhibit interference to or from the terrestrial stations (200-5).

EEE19. The system of EEE18, wherein the one or more beams generated by the satellite antenna are directed towards the satellite (200-4).

EEE20. A satellite earth station (200-3), or a node connected thereto, for use in the system of any one of EEE1 to EEE18.

EEE21. A terrestrial station, or a node connected thereto, for use in the system of any one of EEE1 to EEE18.

EEE22. A method of operating the system of any one of EEE1 to EEE18, in which method the terrestrial frequencies and satellite frequencies are allocated without coordination there between.

EEE23. A method of operating the system of any one of EEE1 to EEE18, in which each of the network elements (satellite (200-4), satellite gateways (200-3), satellite user terminals (100-1), base stations (200-5), terrestrial user terminals (100-2)) have cognitive radio capabilities.

EEE24. The system of EEE23, wherein each node can allocate frequencies independently without causing harming interference to the other nodes.

EEE25. A method of operating the system of any preceding EEEs, wherein the satellite (200-4) can allocate frequencies (UL1,DL1,UL3,DL3) autonomously and/or based on recommendations from a central node AIDARES (300).

EEE26. A method of operating the system of any preceding EEEs, wherein the satellite ground station (200-3) can allocate frequencies (UL3,DL3) autonomously and/or based on recommendations from a central node AIDARES (300).

EEE27. A method of operating the system of any preceding EEEs, wherein the terrestrial base stations (200-5) can allocate frequencies (UL2,DL2,UL4,DL4) autonomously and/or based on recommendations from a central node AIDARES (300).

EEE28. A method of operating the system of any preceding EEEs, wherein the user terminals (100-1, 100-2) can allocate frequencies (UL1,DL1,UL2,DL2) autonomously and/or based on recommendations from a central node AIDARES (300), and/or from other nodes (200-1, 200-2, 200-3, 200-4).

EEE29. A method of operating the system of any preceding EEEs, wherein the central node AIDARES (300) acts as frequency broker among the various nodes and systems and issues frequency assignment recommendations to each network node.

EEE30. A method of operating the system of any preceding EEEs, wherein the frequency allocations assignments decisions are distributed automatically among the network nodes as to minimize intra and inter-system, interference.

EEE31. A method of operating the system of any preceding EEEs, wherein the frequency allocations assignments decisions are distributed automatically among the network nodes in order to maximize overall spectrum efficiency and frequency re-use.

EEE32. A method to reduce computational time on the cognitive radio on-board the spacecraft or on the terrestrial node (200) by off-loading processing to the AI agent (301). This agent would gather information from different operators (400) and users (200-4) and convey relevant information to certain clusters of nodes (both space and terrestrial) using a deep-learning based recommendation system (301).

EEE33. A method to identify the optimal selection of level of authority on each AI system (decision weights), that will be determined by specific algorithm features resulting from training the space AI system (203) using as input parameters dependencies from AIDARES (300).

EEE34. A multi-objective cost function, which minimizes latency and optimizes spectrum usage by generating weights that define the level of authority going from 0 to 1 where 0 represents full control on AIDARES (300) and 1 represents full control on space or terrestrial node (200).

EEE35. The system of any preceding EEE, wherein user terminal (100-1, 100-2) and gateways (200-3) can implement cognitive functionalities.

EEE36. The system of any preceding EEE, wherein the AIDARES system can be hosted either in space or ground.

EEE37. The system of any preceding EEE, wherein knowledge acquired in one cognitive node (200) is distributed to the rest of cognitive nodes through the network (cooperative learning).

The invention claimed is:

1. An aggregated communication network including one or more communication networks and comprising a plurality of network nodes arranged in a plurality of hierarchical layers, the network nodes including a central node at a highest layer and a remaining network nodes being arranged, as part of the one or more communication networks, in layers below the highest layer, with one or more spatially distributed network nodes at each layer below the highest layer,
- wherein the network nodes in each communication network are interconnected in a tree-like structure via communication links, with respective sub-branches extending from the network nodes via network nodes in lower layers;
- the one or more communication networks are connected to the central node in a star-like structure via respective communication links between the central node and respective network nodes in a next-to-highest layer;
- communication links between network nodes in a lowest layer and network nodes in the next-to-lowest layer are wireless communication links;
- network nodes in at least one layer are configured to measure frequency environments of the respective network node and to generate respective measurement reports;
- the network nodes are configured to generate first information relating to measured frequency environments based on measurement reports of network nodes in lower layers in their respective sub-branch, and, if available, an own measurement report for the respective network node, and to provide the respective first information to a network node in a next higher layer that is connected with the respective network node;
- the central node is configured to generate second information relating to a status of utilization of portions of a frequency spectrum and/or to recommendations for utilizable portions of the frequency spectrum based on items of first information received at the central node, and to provide the second information to network nodes in the next-to-highest layer that are connected with the central node;
- the network nodes are configured to receive items of second information from respective network nodes in the next higher layer that are connected with the respective network node and to provide items of second information to network nodes in a next lower layer that are connected with the respective network node, based on the received second information;
- the network nodes are configured to operate in accordance with a dynamically variable level of authority that indicates a layer that is the lowest layer including network nodes that are allowed to, for their respective sub-branches, assign portions of a frequency spectrum to the wireless communication links between network nodes in a lowest hierarchical layer and network nodes in a next-to-lowest hierarchical layer; and
- upon necessity to assign a portion of the frequency spectrum to a given wireless communication link between a network node in the lowest layer and a network node in the next-to-lowest layer, a network node whose sub-branch includes the given wireless communication link is configured to determine a portion of the frequency spectrum for assignment to the given wireless communication link based on the first information and the second information available at that network node.

2. The aggregated communication network according to claim 1, wherein, for at least one layer, each network node is configured to determine a portion of the frequency spectrum for assignment to a wireless communication link in its sub-branch based on an optimization criterion for joint optimization of frequency resource utilization and level of interference that would result from the assignment.

3. The aggregated communication network according to claim 1, wherein, for at least one layer, each network node is configured to determine a portion of the frequency spectrum for assignment to a wireless communication link in its sub-branch using a machine-learning-based model.

4. The aggregated communication network according to claim 1, wherein a level of authority is configured to be dynamically set for each of respective sub-branches extending from network nodes in a given layer of the aggregated communication network.

5. The aggregated communication network according to claim 1, wherein upon necessity to assign a portion of the frequency spectrum to the uiven wireless communication link between the network node in the lowest layer and the network node in the next-to-lowest layer, the network node whose sub-branch includes the given wireless communication link is configured to, if it determines that it cannot identify a portion of the frequency spectrum for assignment to the given wireless communication link, pass a request for assignment of a portion of the frequency spectrum to the given wireless communication link to the network node in the next higher layer that is connected to that network node.

6. The aggregated communication network according to claim 1, wherein the central node is configured to assess a level of interference, and to determine whether to override any assignment of a portion of the frequency spectrum to a wireless communication link performed by a network node at a layer below the highest layer, based on a result of the assessment.

7. The aggregated communication network according to claim 1, wherein the central node is further configured to, if an assignment of a portion of the frequency spectrum to a given wireless communication link performed by a network node at a layer below the highest layer is subject to override, determine a portion of the frequency spectrum for assignment to the given wireless communication link and assign said portion of the frequency spectrum to the given wireless communication link.

8. The aggregated communication network according to claim 1, wherein the central node is configured to assess a level of interference, and to determine whether to maintain a currently set value of the level of authority, based on a result of the assessment; and
- if the currently set value of the level of authority shall not be maintained, determine a new value of the level of authority based on the items of first information received at the central node and issue instructions to the network nodes at layers below the highest layer indicative of the new value of the level of authority.

9. The aggregated communication network according to claim 1, wherein the central node is configured to determine a frequency and location dependent map of resource utilization based on the items of first information received at the central node and to generate the second information based on the frequency-location-dependent map.

10. The aggregated communication network according to claim 1, wherein the central node is configured to:
upon a network node assigning a portion of the frequency spectrum to a given wireless communication link, determine whether a current level of authority shall be maintained; and
if the current level of authority is not to be maintained, adjust the level of authority and issue a message indicating the adjusted level of authority.

11. The aggregated communication network according to claim 1, wherein the central node is configured to dynamically set the level of authority for each of respective sub-branches extending from network nodes in a given layer of the aggregated communication network based on the first information available at the central node.

12. The aggregated communication network according to claim 1, wherein the network nodes in the lowest layer are configured to issue requests for assignment of a portion of the frequency spectrum to the wireless communication link between the respective network node and a network node in the next-to-lowest hierarchical layer that is connected to the respective network node.

13. The aggregated communication network according to claim 1,
wherein the aggregated communication network comprises five layers from the lowest layer to the highest layer;
the network nodes at the lowest layer relate to user terminals;
the network nodes at the next-to-lowest layer relate to satellite transmitters or terrestrial transmitters;
the network nodes at a third lowest layer relate to gateway stations for the satellite transmitters or the terrestrial transmitters; and/or
the network nodes at a fourth lowest layer or the next-to-highest layer relate to network operation centers.

14. A network node for use in a hierarchical layer of an aggregated communication network including one or more communication networks and comprising a plurality of network nodes arranged in a plurality of hierarchical layers, the network nodes including a central node at a highest layer and a remaining network nodes being arranged, as part of the one or more communication networks in the layers below the highest layer, with one or more spatially distributed network nodes at each layer below the highest layer,
wherein the network nodes in each communication network are interconnected in a tree-like structure via communication links, with respective sub-branches extending from the network nodes via network nodes in lower layers;
the one or more communication networks are connected to the central node in a star-like structure via respective communication links between the central node and respective network nodes in a next-to-highest layer;
communication links between network nodes in a lowest layer and network nodes in the next-to-lowest layer are wireless communication links; and
the network node is configured to:
measure a frequency environment of the network node and to generate a measurement report;
generate first information relating to measured frequency environments based on measurement reports of network nodes in lower layers in the sub-branch of the network node and an own measurement report of the network node, and to provide the first information to a network node in a next higher layer that is connected with the network node;
receive an item of second information relating to a status of utilization of portions of a frequency spectrum and/or to recommendations for utilizable portions of the frequency spectrum from a respective network node in the next higher layer that is connected with the network node, and to provide items of second information to network nodes in the next lower layer that are connected with the network node, based on the received second information;
operate in accordance with a dynamically variable level of authority that indicates a layer that is the lowest layer including network nodes that are allowed to, for their respective sub-branches, assign portions of a frequency spectrum to the wireless communication links between network nodes in the lowest hierarchical layer and network nodes in the next-to-lowest hierarchical layer; and
upon necessity to assign a portion of the frequency spectrum to a given wireless communication link between a given network node in the lowest layer and a given network node in the next-to-lowest layer in the sub-branch of the network node, determine a portion of the frequency spectrum for assignment to the given wireless communication link based on the first information and the second information available at the network node.

15. A central node for use in an aggregated communication network including one or more communication networks and comprising a plurality of network nodes arranged in a plurality of hierarchical layers, the network nodes including a central node at a highest layer and a remaining network nodes being arranged, as part of the one or more communication networks in the layers below the highest layer, with one or more spatially distributed network nodes at each layer below the highest layer,
wherein the network nodes in each communication network are interconnected in a tree-like structure via communication links, with respective sub-branches extending from the network nodes via network nodes in lower layers;
the one or more communication networks are connected to the central node in a star-like structure via respective communication links between the central node and respective network nodes in a next-to-highest layer;
communication links between network nodes in a lowest layer and network nodes in the next-to-lowest layer are wireless communication links;
network nodes in at least one layer are configured to measure frequency environments of the respective network node and to generate respective measurement reports;
the network nodes are configured to generate first information relating to measured frequency environments based on measurement reports of network nodes in lower layers in their respective sub-branch, and, if available, an own measurement report for the respective network node, and to provide the respective first information to a network node in a next higher layer that is connected with the respective network node; and the central node is configured to generate second information relating to a status of utilization of portions of a frequency spectrum and/or to recommendations for utilizable portions of the frequency spectrum based on items of first information received at the central node and to provide the second information to network nodes in the next-to-highest layer that are connected with the central node, such that the network nodes are enabled to:
receive items of second information from respective network nodes in the next higher layer that are connected with the respective network node and to provide items of second information to network nodes in a next lower layer that are connected with the respective network node, based on the received second information;
operate in accordance with a dynamically variable level of authority that indicates a layer that is the lowest layer including network nodes that are allowed to, for their respective sub-branches, assign portions of a frequency spectrum to the wireless communication links between network nodes in a lowest hierarchical layer and network nodes in a next-to-lowest hierarchical layer; and
upon necessity to assign a portion of the frequency spectrum to a given wireless communication link between a given network node in the lowest layer and a given network node in the next-to-lowest layer in the sub-branch of the network node, determine a portion of the frequency spectrum for assignment to the given wireless communication link based on the first information and the second information available at the network node.

16. A method of operating an aggregated communication network including one or more communication networks and comprising a plurality of network nodes arranged in a plurality of hierarchical layers, the network nodes including a central node at a highest layer and a remaining network nodes being arranged, as part of the one or more communication networks in the layers below the highest layer, with one or more spatially distributed network nodes at each layer below the highest layer,
wherein the network nodes in each communication network are interconnected in a tree-like structure via communication links, with respective sub-branches extending from the network nodes via network nodes in lower layers;
the one or more communication networks are connected to the central node in a star-like structure via respective communication links between the central node and respective network nodes in a next-to-highest layer;
communication links between network nodes in a lowest layer and network nodes in a next-to-lowest layer are wireless communication links; and
the method comprises:
by network nodes in at least one layer, measuring frequency environments of the respective network nodes and generating respective measurement reports;
by the network nodes, generating first information relating to measured frequency environments based on measurement reports of network nodes in lower layers in their respective sub-branch, and, if available, an own measurement report for the respective network node, and providing the respective first information to a network node in a next higher layer that is connected with the respective network node;
by the central node generating second information relating to a status of utilization of portions of a frequency spectrum and/or to recommendations for utilizable portions of the frequency spectrum based on items of first information received at the central node and providing the second information to network nodes in the next-to-highest layer that are connected with the central node;
by the network nodes, receiving items of second information from respective network nodes in the next higher layer that are connected with the respective network node and providing items of second information to network nodes in the next lower layer that are connected with the respective network node, based on the received second information;
by the network nodes, operating in accordance with a dynamically variable level of authority that indicates a layer that is the lowest layer including network nodes that are allowed to, for their respective sub-branches, assign portions of a frequency spectrum to the wireless communication links between network nodes in the lowest hierarchical layer and network nodes in the next-to-lowest hierarchical layer; and
upon necessity to assign a portion of the frequency spectrum to a given wireless communication link between a network node in the lowest layer and a network node in the next-to-lowest layer, by a network node whose sub-branch includes the given wireless communication link, determining a portion of the frequency spectrum for assignment to the given wireless communication link based on the first information and the second information available at that network node.

17. A method of operating a network node in a hierarchical layer of an aggregated communication network including one or more communication networks and comprising a plurality of network nodes arranged in a plurality of hierarchical layers, the network nodes including a central node at a highest layer and the g remaining network nodes being arranged, as part of the one or more communication networks in the layers below the highest layer, with one or more spatially distributed network nodes at each layer below the highest layer,
wherein the network nodes in each communication network are interconnected in a tree-like structure via communication links, with respective sub-branches extending from the network nodes via network nodes in lower layers;
the one or more communication networks are connected to the central node in a star-like structure via respective communication links between the central node and respective network nodes in a next-to-highest layer;
communication links between network nodes in a lowest layer and network nodes in the next-to-lowest layer are wireless communication links; and
the method comprises, by the network node:
measuring a frequency environment of the network node and generating a measurement report;
generating first information relating to measured frequency environments based on measurement reports of network nodes in lower layers in the sub-branch of the network node and an own measurement report of the network node, and providing the first information to a network node in a next higher layer that is connected with the network node;
receiving an item of second information relating to a status of utilization of portions of a frequency spectrum and/or to recommendations for utilizable portions of the frequency spectrum from a respective network node in the next higher layer that is connected with the network node, and providing items of second information to network nodes in the next lower layer that are connected with the network node, based on the received second information;

operating in accordance with a dynamically variable level of authority that indicates a layer that is the lowest layer including network nodes that are allowed to, for their respective sub-branches, assign portions of a frequency spectrum to the wireless communication links between network nodes in the lowest hierarchical layer and network nodes in the next-to-lowest hierarchical layer; and upon necessity to assign a portion of the frequency spectrum to a given wireless communication link between a given network node in the lowest layer and a given network node in the next-to-lowest layer in the sub-branch of the network node, determining a portion of the frequency spectrum for assignment to the given wireless communication link based on the first information and the second information available at the network node.

18. A method of operating a central node in an aggregated communication network including one or more communication networks and comprising a plurality of network nodes arranged in a plurality of hierarchical layers, the network nodes including a central node at a highest layer and the remaining network nodes being arranged, as part of the one or more communication networks, in the layers below the highest layer, with one or more spatially distributed network nodes at each layer below the highest layer, wherein the network nodes in each communication network are interconnected in a tree-like structure via communication links, with respective sub-branches extending from the network nodes via network nodes in lower layers;

the one or more communication networks are connected to the central node in a star-like structure via respective communication links between the central node and respective network nodes in a next-to-highest layer;

communication links between network nodes in a lowest layer and network nodes in the next-to-lowest layer are wireless communication links;

network nodes in at least one layer are configured to measure frequency environments of the respective network node and to generate respective measurement reports;

the network nodes are configured to generate first information relating to measured frequency environments based on measurement reports of network nodes in lower layers in their respective sub-branch, and, if available, an own measurement report for the respective network node, and to provide the respective first information to a network node in a next higher layer that is connected with the respective network node; and the method comprises, by the central node generating second information relating to a status of utilization of portions of a frequency spectrum and/or to recommendations for utilizable portions of the frequency spectrum based on items of first information received at the central node and providing the second information to network nodes in the next-to-highest layer that are connected with the central node, such that the network nodes are enabled to:

receive items of second information from respective network nodes in the next higher layer that are connected with the respective network node and to provide items of second information to network nodes in a next lower layer that are connected with the respective network node, based on the received second information;

operate in accordance with a dynamically variable level of authority that indicates a layer that is the lowest layer including network nodes that are allowed to, for their respective sub-branches, assign portions of a frequency spectrum to the wireless communication links between network nodes in a lowest hierarchical layer and network nodes in a next-to-lowest hierarchical layer; and upon necessity to assign a portion of the frequency spectrum to a given wireless communication link between a given network node in the lowest layer and a given network node in the next-to-lowest layer in the sub-branch of the network node, determine a portion of the frequency spectrum for assignment to the given wireless communication link based on the first information and the second information available at the network node.

\* \* \* \* \*